United States Patent
Ohsawa et al.

(10) Patent No.: US 10,431,851 B2
(45) Date of Patent: Oct. 1, 2019

(54) NON-AQUEOUS ELECTROLYTE SECONDARY BATTERY AND METHOD FOR MANUFACTURING THE SAME

(71) Applicant: NISSAN MOTOR CO., LTD., Yokohama-shi, Kanagawa (JP)

(72) Inventors: Yasuhiko Ohsawa, Kanagawa (JP); Yuki Kusachi, Kanagawa (JP); Hiroshi Akama, Kanagawa (JP); Hideaki Horie, Kanagawa (JP); Yusuke Mizuno, Kyoto (JP); Kenichi Kawakita, Kyoto (JP); Yasuhiro Shindo, Kyoto (JP); Yasuhiro Tsudo, Kyoto (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/539,460

(22) PCT Filed: Dec. 25, 2015

(86) PCT No.: PCT/JP2015/086179
§ 371 (c)(1),
(2) Date: Jun. 23, 2017

(87) PCT Pub. No.: WO2016/104679
PCT Pub. Date: Jun. 30, 2016

(65) Prior Publication Data
US 2018/0048023 A1 Feb. 15, 2018

(30) Foreign Application Priority Data

Dec. 26, 2014 (JP) ................. 2014-265522

(51) Int. Cl.
| | |
|---|---|
| *H01M 10/0565* | (2010.01) |
| *H01M 4/13* | (2010.01) |
| *H01M 4/139* | (2010.01) |
| *H01M 4/36* | (2006.01) |
| *H01M 10/0585* | (2010.01) |

(52) U.S. Cl.
CPC ......... *H01M 10/0565* (2013.01); *H01M 4/13* (2013.01); *H01M 4/139* (2013.01); *H01M 4/36* (2013.01); *H01M 10/0585* (2013.01); *H01M 2220/20* (2013.01); *H01M 2300/0025* (2013.01)

(58) Field of Classification Search
CPC .............. H01M 10/0565; H01M 4/36; H01M 2300/0025
See application file for complete search history.

(56) References Cited

U.S. PATENT DOCUMENTS

| | | | |
|---|---|---|---|
| 9,680,147 | B2 | 6/2017 | Kim |
| 2005/0064096 | A1 | 3/2005 | Kurihara et al. |
| 2013/0202960 | A1 | 8/2013 | Kim |
| 2014/0231719 | A1 | 8/2014 | Cha et al. |

FOREIGN PATENT DOCUMENTS

| | | |
|---|---|---|
| CN | 103460463 A | 12/2013 |
| JP | 9-204936 A | 8/1997 |
| JP | 2003-331823 A | 11/2003 |
| JP | 2003-331838 A | 11/2003 |
| JP | 2005-78943 A | 3/2005 |
| JP | 2007-265668 A | 10/2007 |
| JP | 2013-127872 A | 6/2013 |
| JP | 2013-206623 A | 10/2013 |
| JP | 2014-157661 A | 8/2014 |
| KR | 2014-0104269 A | 8/2014 |

OTHER PUBLICATIONS

Takaya Sato et al., New Design for a Safe Lithium-Ion Gel Polymer Battery, Journal of Power Sources, 152, 2005, pp. 264-271.

*Primary Examiner* — Ladan Mohaddes

(74) *Attorney, Agent, or Firm* — Foley & Lardner LLP

(57) ABSTRACT

To provide a structure which allows production of an electrode, even if the film thickness of an electrode is increased; and a non-aqueous electrolyte secondary battery using the same.

A non-aqueous electrolyte secondary battery including a power generating element including: two electrodes having different polarity and formed by forming an active material layer on a current collector; and an electrolyte layer positioned between the electrodes, wherein at least one of the active material layers of the two electrodes having different polarity contains an active material and a conductive member made from an electron conducting material, the active material layer has a first principal surface which comes into contact with the electrolyte layer side, and a second principal surface which comes into contact with the current collector side, at least a part of the conductive member forms a conductive path electrically connecting the first principal surface to the second principal surface, and the conductive path is in contact with the active material in the periphery of the conductive path, at least a part of the surface of the active material is coated with a coating agent that includes a coating resin and a conduction assisting agent, and an electrolyte solution contained in the electrolyte layer or the two electrodes having different polarity is a gel phase electrolyte.

11 Claims, 8 Drawing Sheets

(a)

(b)

(a)

(b)

NON-AQUEOUS ELECTROLYTE SECONDARY BATTERY AND METHOD FOR MANUFACTURING THE SAME

TECHNICAL FIELD

The present invention relates to a non-aqueous electrolyte secondary battery and a method for manufacturing the same.

BACKGROUND ART

Recently, there has been a strong demand for a reduction in carbon dioxide emissions in order to have environmental protection. The automobile industry expects that the introduction of electric vehicles (EV) or hybrid electric vehicles (HEV) will lead to a reduction in carbon dioxide emissions. Thus, intensive efforts are being made to develop a motor driving secondary battery which holds the key to the practical application of those electric vehicles. As for the secondary battery, attention is drawn to a lithium ion secondary battery which can achieve high energy density and high output density.

Recently, the use of various electric vehicles has been promoted with the expectation of solving environmental/energy issues. A secondary battery is being developed intensively as a vehicle-mounted power source, such as a motor driving power source, which holds the key to the widespread use of these electric vehicles. However, in order to ensure widespread use, it is necessary to increase the performance and reduce the cost of batteries. In addition, with an electric vehicle, it is necessary to bring the single-charge driving distance closer to that of a gasoline engine vehicle. Thus, batteries with higher energy density are in demand. In order for batteries to have a high energy density, it is necessary to reduce as much as possible battery members that are not directly related to a battery reaction. As a battery which allows saving of current collecting tab of a battery single cell or bus bar for connection between single cells, has very high volume efficiency, and is suitable for mounting in vehicles, a bipolar type secondary battery has been suggested. In a bipolar type secondary battery (also referred to as bipolar secondary battery), a bipolar type electrode in which a positive electrode is formed on one surface of a current collector and a negative electrode is formed on the other surface of a current collector is used. Furthermore, it has a structure in which plural bipolar electrodes are layered such that the positive electrode and negative electrode can face each other while being mediated by a separator containing an electrolyte layer. Accordingly, the bipolar type secondary battery forms one battery cell (i.e., single battery) consisting of a current collector, a positive electrode and a negative electrode present between current collectors, and a separator (i.e., electrolyte layer). Furthermore, for the purpose of having even higher performance, use of a resin in which a conductive filler is dispersed in a current collector has been suggested.

For a lithium ion secondary battery with the aforementioned constitution, high energy density is important as a basic characteristic in order to have storage of energy that is required for running automobiles. As a method for increasing the energy density of a battery, a method in which ratio of a positive electrode material and a negative electrode material within a battery is increased is known. In Patent Literature 1, a means for increasing energy density of a battery by lowering the relative ratio of a current collector or a separator is disclosed.

CITATION LIST

Patent Literatures

Patent Literature 1: JP 9-204936 A

SUMMARY OF INVENTION

Technical Problem

As described in Patent Literature 1, it is believed that having increased film thickness of an electrode may lead to reduction of relative ratio of a current collector or a separator and is effective for increasing the energy density.

However, according to a conventional method of applying slurry of an active material on a current collector to increase the film thickness of an electrode, there has been a case in which manufacture of an electrode itself becomes difficult.

As such, it is necessary to create a structure which still allows manufacture of an electrode even when the film thickness of an electrode is increased.

Solution to Problem

The inventors of the present invention conducted intensive studies to solve the problems described above.

As a result, by having, as a constitutional member of an electrode, a first principal surface which comes into contact with an electrolyte layer side, and a second principal surface which comes into contact with a current collector side, and by including a conductive member which forms a conductive path in contact with an active material and electrically connecting the first principal surface to the second principal surface, a thick electrode can be manufactured.

Namely, provided is a non-aqueous electrolyte secondary battery in which at least one of the electrodes contains a conductive member and an active material coated with a coating agent that includes a coating resin and a conduction assisting agent and the conductive member forms a conductive path which is in contact with an active material and electrically connects both principal surfaces. Accordingly, it was found that the aforementioned problems can be solved, and the present invention is completed.

Effect of Invention

According to the invention, by including a conductive member which forms a conductive path in contact with an active material and electrically connecting the first principal surface to the second principal surface, a non-aqueous electrolyte secondary battery with increased electrode film thickness can be achieved.

Furthermore, the electrolyte of the non-aqueous electrolyte secondary battery of the present invention is gellated. Thus, even under increased vibration, an influence of gellation is low so that the constitutional member of an electrode can be stably maintained. As a result, the cycle characteristics are also improved.

DESCRIPTION OF EMBODIMENTS

Figure 1:
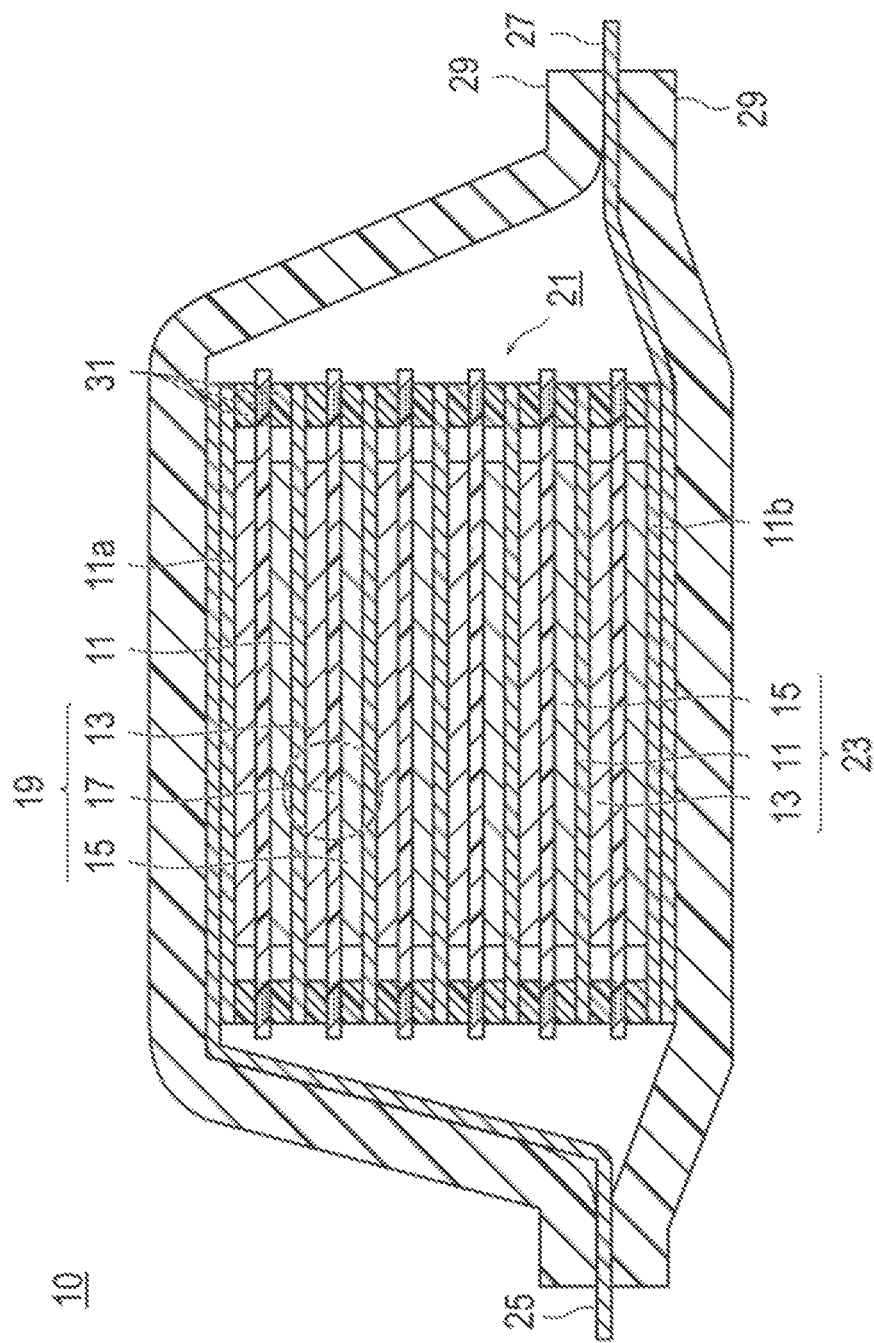
FIG. 1 is a cross-sectional view schematically illustrating a bipolar secondary battery as one embodiment of the present invention.

Provided by one embodiment of the present invention is a non-aqueous electrolyte secondary battery having a power generating element including two electrodes having different polarity and formed by forming an active material layer on a current collector; and an electrolyte layer placed between the electrodes in which at least one of the active material layers of the two electrodes having different polarity contains an active material and a conductive member made from an electron conducting material, and the active material layer has a first principal surface which comes into contact with the electrolyte layer side, and a second principal surface which comes into contact with the current collector side, at least a part of the conductive member forms a conductive path electrically connecting the first principal surface to the second principal surface, and the conductive path is in contact with the active material in the periphery of the conductive path, at least a part of the surface of the active material is coated with a coating agent that includes a coating resin and a conduction assisting agent, and the electrolyte solution contained in the two electrodes having different polarity or the electrolyte layer is a gel phase electrolyte.

According to the present invention, by including a conductive member which forms a conductive path in contact with an active material and electrically connecting the first principal surface to the second principal surface, a non-aqueous electrolyte secondary battery with increased electrode film thickness can be provided.

Furthermore, the electrolyte solution of the non-aqueous electrolyte secondary battery of the present invention is gellated. As there is a gellated electrolyte, a homogenous electrode reaction can be obtained without having any deformation even when certain force is applied locally on an electrode, and it leads to an improvement of the cycle characteristics.

Hereinbelow, embodiments of the present invention are explained in detail in view of drawings, but the technical scope of the present invention shall be defined by the description of the claims and it is not limited to the following embodiments. Furthermore, the dimensional ratio in the drawings is exaggerated for the sake of convenience of explanation, and it may be different from the actual ratio.

Furthermore, in the present specification, the bipolar lithium ion secondary battery may be simply referred to as a "bipolar secondary battery", and an electrode for a bipolar lithium ion secondary battery may be simply referred to as a "bipolar electrode". Furthermore, the term referred to as an "active material" may mean any one of a positive electrode active material and a negative electrode active material, or both of them. The same shall apply to an "active material layer". Those can be reasonably interpreted by a person skilled in the art.

<Bipolar Secondary Battery>

FIG. 1 is a cross-sectional view which schematically illustrates a bipolar secondary battery as one embodiment of the present invention. A bipolar secondary battery 10 illustrated in FIG. 1 has a structure in which an approximately rectangular power generating element 21, in which a charging and discharging reaction actually occurs, is sealed inside a laminate film 29 as a battery outer casing material.

As illustrated in FIG. 1, the power generating element 21 of the bipolar secondary battery 10 of this embodiment has plural bipolar electrode 23 in which a positive electrode active material layer 13 electrically bound on one surface of a current collector 11 is formed and a negative electrode active material layer 15 bound on the other surface of a current collector 11 is formed. Each bipolar electrode 23 is laminated via an electrolyte layer 17 to form the power generating element 21. Furthermore, the electrolyte layer 17 has a constitution in which an electrolyte is supported in planar center part of a separator as a substrate. In that case, the bipolar electrode 23 and the electrolyte layer 17 are alternately laminated such that the positive electrode active material layer 13 of one bipolar electrode 23 and the negative electrode active material layer 15 of the other bipolar electrode 23 which is adjacent to said one bipolar electrode 23 can face each other via the electrolyte layer 17. Namely, it is an arrangement in which the electrolyte layer 17 is inserted between the positive electrode active material layer 13 of one bipolar electrode 23 and the negative electrode active material layer 15 of the other bipolar electrode 23 which is adjacent to said one bipolar electrode 23.

The adjacent positive electrode active material layer 13, the electrolyte layer 17, and the negative electrode active material layer 15 form one single battery layer 19. Thus, it can be said that the bipolar secondary battery 10 has a constitution in which the single battery layer 19 is laminated. In addition, on outer periphery of the single battery layer 19, a seal part (i.e., insulating layer) 31 is disposed. Accordingly, liquid junction caused by leakage of an electrolyte solution from the electrolyte layer 17 is prevented, contact between neighboring current collector 11 in a battery or an occurrence of short circuit resulting from subtle displacement of an end part of the single battery layer 19 in the power generating element 21 is prevented. Furthermore, only on a single surface of the outermost layer current collector 11a on the positive electrode side which is present on the outermost layer of the power generating element 21, the positive electrode active material layer 13 is formed. Furthermore, only on a single surface of the outermost layer current collector 11b on the negative electrode side which is present on the outermost layer of the power generating element 21, the negative electrode active material layer 15 is formed.

Furthermore, in the bipolar secondary battery 10 illustrated in FIG. 1, a positive electrode current collecting plate 25 is disposed such that it can be adjacent to the outermost layer current collector 11a on the positive electrode side, and it is extended and drawn from the laminate film 29 as a battery outer casing material. Incidentally, a negative electrode current collecting plate 27 is disposed such that it can be adjacent to the outermost layer current collector 11b on the negative electrode side, and it is also extended and drawn from the laminate film 29 as a battery outer casing material.

The number of times of laminating the single battery layer 19 is adjusted depending on desired voltage. Even for the bipolar secondary battery 10, to prevent environmental deterioration and impact from outside at the time of use, it is preferable to have a structure in which the power generating element 21 is sealed under reduced pressure in the laminate film 29 as a battery outer casing material, and the positive electrode current collecting plate 25 and the negative electrode current collecting plate 27 are drawn to the outside of the laminate film 29. Furthermore, although embodiments of the present invention are explained herein by using a bipolar secondary battery as an example, type of a non-aqueous electrolyte battery to which the present invention can be applied is not particularly limited, and an application can be made to any non-aqueous electrolyte secondary battery known in the art such as so-called parallel lamination type battery in which a power generating element is composed of single battery layers that are connected to each other in parallel.

Hereinbelow, explanations are given for main constitutional elements of the bipolar secondary battery of this embodiment.

[Current Collector]

The current collector has a function of mediating electron transfer from one surface in contact with a positive electrode active material layer to the other surface in contact with a negative electrode active material layer. The material for forming a current collector is not particularly limited, but a metal or a resin with conductivity can be adopted.

Specific examples of the metal include aluminum, nickel, iron, stainless steel, titanium, and copper. In addition to them, a clad material of nickel and aluminum, a clad material of copper and aluminum, or a plating material of a combination of those metals can be preferably used. It can be also a foil obtained by coating aluminum on a metal surface. Among them, from the viewpoint of electroconductivity or potential for operating a battery, aluminum, stainless steel, copper, and nickel are preferable.

As for the latter resin with conductivity, a resin formed by a conductive polymer material or a non-electron conductive polymer material optionally added with a conductive filler can be mentioned. Examples of the electroconductive polymer material include polyaniline, polypyrrole, polythiophene, polyacetylene, polyparaphenylene, polyphenylenevinylene, polyacrylonitrile, polyoxadiazole and the like. These electroconductive polymer materials have sufficient electroconductivity even if an electroconductive filler is not added, and therefore, they are advantageous in terms of facilitating manufacturing process or of reducing weight of the current collector.

Examples of the non-electroconductive polymer material include polyethylene (PE; high density polyethylene (HDPE), low density polyethylene (LDPE), etc.), polypropylene (PP), polyethylene terephthalate (PET), polyethernitrile (PEN), polyimide (PI), polyamideimide (PAI), polyamide (PA), polytetrafluoroethylene (PTFE), styrenebutadiene rubber (SBR), polyacrylonitrile (PAN), polymethylacrylate (PMA), polymethylmethacrylate (PMMA), polyvinyl chloride (PVC), polyvinylidene fluoride (PVdF), polystyrene (PS) and the like. Such non-electroconductive polymer materials may have excellent voltage resistance or solvent resistance.

To the above-mentioned electroconductive polymer materials or to the non-electroconductive polymer materials, if necessary, an electroconductive filler can be added. In particular, when a resin to be a base material of the current collector includes only a non-electroconductive polymer, an electroconductive filler is indispensable in order to give electroconductivity to the resin.

As the electroconductive filler, any material can be used if it has electroconductivity, without particular limitation. For example, as a material excellent in electroconductivity, potential resistance, or lithium ion shielding characteristics, a metal, an electroconductive carbon or the like can be mentioned. As the metal, although there is no particular limitation, it is preferable to contain at least one metal selected from the group including Ni, Ti, Al, Cu, Pt, Fe, Cr, Sn, Zn, In, and Sb, or an alloy or metal oxide containing these metals. Further, as the electroconductive carbon, although there is no particular limitation, it is preferably one containing at least one kind selected from the group including acetylene black, VULCAN, BLACK PEARL, carbon nanofiber, Ketjen black, carbon nanotube, carbon nanohorn, carbon nanobaloon and fullerene.

The addition amount of the electroconductive filler is not particularly limited, if it can give sufficient electroconductivity to the current collector, and generally, it is around 5 to 35% by mass.

Furthermore, the current collector of this embodiment may have a single layer structure composed of a single material or a laminate structure in which layers composed for those materials are suitably combined. Furthermore, from the viewpoint of blocking the transfer of lithium ions between single battery layers, it is possible to form a metal layer on part of the current collector.

[Positive Electrode Active Material Layer, Negative Electrode Active Material Layer]

According to the embodiment of the present invention, at least one of the positive electrode active material layer and negative electrode active material layer includes a conductive member composed of electron conducting material and an active material. In this embodiment, at least a part of the surface of the active material is coated with a coating agent that includes a coating resin and a conduction assisting agent. Furthermore, according to the embodiment of the present invention, the active material layer has a first principal surface which comes into contact with the electrolyte layer side, and a second principal surface which comes into contact with the current collector side. Furthermore, at least a part of the conductive member forms a conductive path electrically connecting the first principal surface to the second principal surface.

The embodiment of the present invention includes an exemplary case in which the conductive member is a conductive fiber consisting part of non-woven fabric, an exemplary case in which the conductive member is a conductive fiber consisting part of woven or knitted fabric, an exemplary case in which the conductive member is a conductive fiber dispersed between the first principal surface and the second principal surface, and an exemplary case in which the conductive member is a conduction-treated resin consisting part of a foamed resin.

First, by using a drawing, explanations are given for an example in which the conductive member is a conductive fiber consisting part of non-woven fabric.

Figure 2:
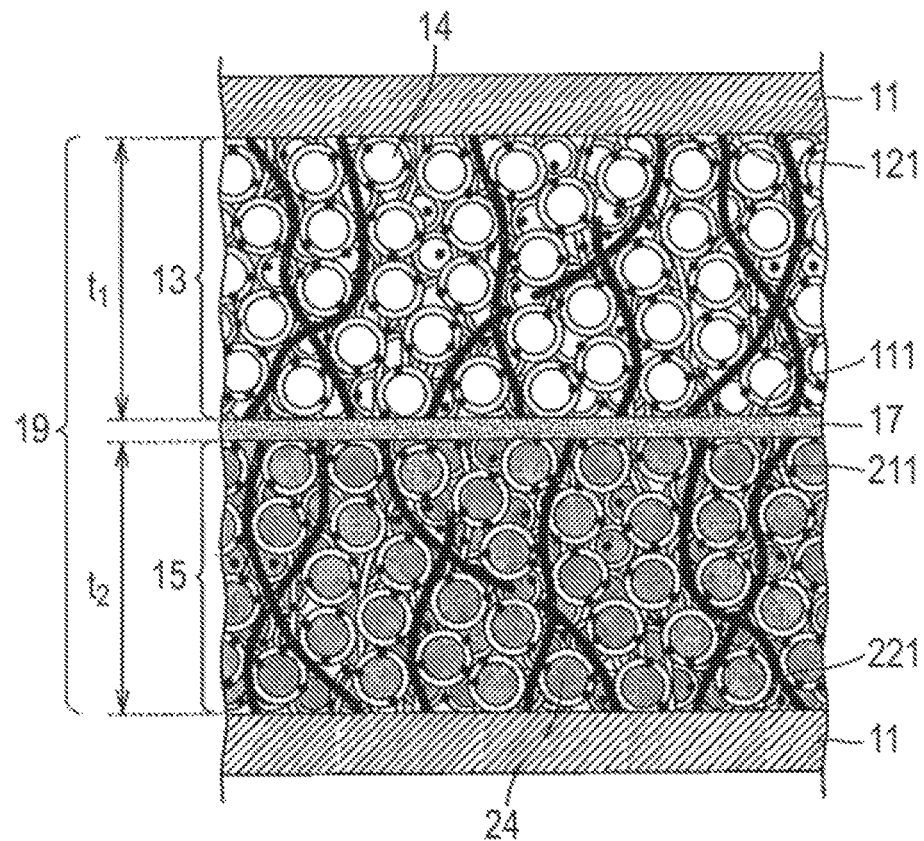
FIG. 2 is a cross-sectional view schematically illustrating an enlarged part of an encircled portion in FIG. 1.

FIG. 2 is a cross-sectional view schematically illustrating the enlarged part of the encircled portion in FIG. 1.

As illustrated in FIG. 2, it has a structure in which the single battery layer 19 is sandwiched by two pieces of the current collector 11.

The positive electrode active material layer 13 has a sheet shape with pre-determined thickness of t1, and it is provided with a first principal surface 111 disposed on the electrolyte layer 17 side and a second principal surface 121 disposed on the current collector 11 side. The positive electrode active material 14 is included in the positive electrode active material layer 13. In this embodiment, the positive electrode active material 14 is coated with a coating agent, and explanations therefor will be given later.

Similar to the above, the negative electrode active material layer 15 has a sheet shape with pre-determined thickness of t2, and it is provided with a first principal surface 211 disposed on the electrolyte layer 17 side and a second principal surface 221 disposed on the current collector 11 side. The negative electrode active material 24 is included in the negative electrode active material layer 15. In this embodiment, the negative electrode active material 24 is coated with a coating agent, and explanations therefor will be given later.

It is preferable that the thickness t1 of the positive electrode active material layer 13 and the thickness t2 of the negative electrode active material layer 15 are, each independently, 150 to 1500 μm. When the electrode is thick like that, a large amount of the active material can be included in a battery, a battery with high capacity can be prepared, and it is effective for increasing the energy density. The thickness t1 is more preferably 200 to 950 μm, and even more preferably 250 to 900 μm. The thickness t2 is more preferably 200 to 950 μm, and even more preferably 250 to 900 μm. According to the characteristic structure of the present invention, an electrode with such thickness can be achieved, and it is effective for increasing the energy density.

Figure 3:
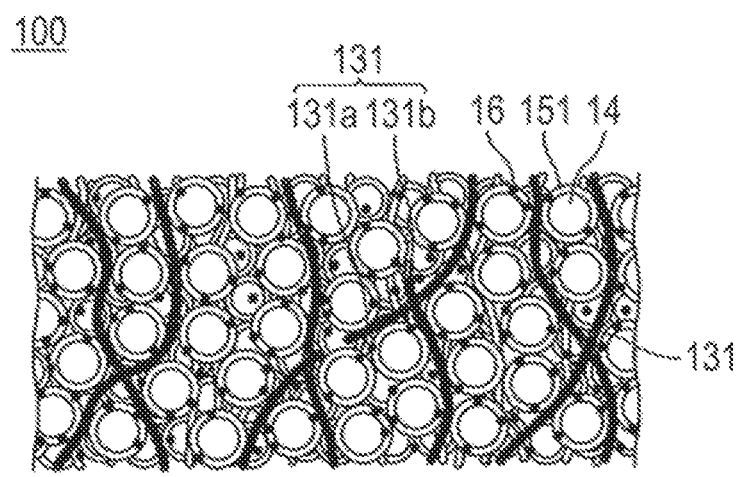
FIG. 3 is a cross-sectional view schematically illustrating only a positive electrode active material layer illustrated in FIG. 2.

FIG. 3 is a cross-sectional view schematically illustrating only a positive electrode active material layer illustrated in FIG. 2.

As illustrated in FIG. 3, a positive electrode active material layer 100 is provided with the first principal surface 111 and the second principal surface 121 (not illustrated in the drawing). Furthermore, between the first principal surface 111 and the second principal surface 121, a conductive fiber 131 as a conductive member and a positive electrode active material 14 as an active material are included.

According to the embodiment illustrated in FIG. 3, the conductive member is a conductive fiber 131 which forms part of non-woven fabric. Because there are many voids in a non-woven fabric, an electrode can be formed by filling the active material 14 in the voids. Filling the voids with coated active material will be described later in detail.

In the conductive fiber 131, an end part on one side of part of the fiber reaches the first principal surface 111 and an end on the other side reaches the second principal surface 121. Consequently, at least a part of the conductive fiber 131 forms a conductive path which electrically connects the first principal surface 111 to the second principal surface 121.

Furthermore, between the first principal surface 111 and the second principal surface 121, many conductive fiber 131 are present in entangled state. However, even for a case in which the plural conductive fiber 131 are in contact with one another to yield continuous connection from the first principal surface 111 to the second principal surface 121, it can be said that the conductive fiber forms a conductive path which electrically connects the first principal surface 111 to the second principal surface 121.

In FIG. 3, an example of the conductive fiber 131 which corresponds to a conductive path electrically connecting the first principal surface 111 to the second principal surface 121 is illustrated. The fiber represented by the conductive fiber 131a is an example in which one conductive fiber serves as a conductive path while the two fibers represented by the conductive fiber 131b are an example in which two conductive fibers serve as a conductive path as they are in contact with each other.

Examples of the conductive fiber include carbon fiber such as PAN carbon fiber and pitch carbon fiber, conductive fiber containing a highly conductive metal or graphite uniformly dispersed in synthetic fiber, metal fiber obtained by converting metals such as stainless steel into fiber, conductive fiber containing organic fiber whose surface is coated with a metal, and conductive fiber containing organic fiber whose surface is coated with a resin containing a conductive substance. Among these conductive fibers, carbon fiber is preferred.

In the present embodiment, the conductive member preferably has an electrical conductivity of 50 mS/cm or more. The electrical conductivity can be determined by measuring the volume resistivity in accordance with JIS R 7609 (2007) "Carbon fiber—Method for determination of volume resistivity" and calculating the reciprocal of the volume resistivity. As the electrical conductivity is 50 mS/cm or more, the conductive paths that are formed of the conductive fiber and connect the first principal surface 111 to the second principal surface 121 have small electrical resistance and allow smooth transfer of electrons from the active material far from the current collector, and therefore desirable.

The conductive fiber preferably has an average fiber diameter of 0.1 to 20 μm. The fiber diameter of the conductive fiber is measured by SEM observation. The average fiber diameter of the conductive fiber is determined as follows. Ten conductive fibers are randomly selected in a 30 μm-square field of view. The diameter at or near the middle of each of the ten fiber is measured. This measurement is performed at three fields of view. The average of the diameters of a total of 30 fibers is taken as the measured value.

The fiber length of the conductive fiber is not particularly limited.

In the present embodiment, the active material is a coated active material in which part of the surface of the material is coated with a coating agent 151 that includes a coating resin and a conduction assisting agent 16. Details will be described later.

The conductive paths formed of the conductive fiber 131 are in contact with the positive electrode active material 14 around the conductive paths. Such contact of the conductive paths with the positive electrode active material allows the electrons generated from the positive electrode active material particles to quickly reach the conductive paths and flow through the conductive paths to the current collector. Since the conductive paths are formed of the conductive member that is an electron conductive material, electrons can smoothly reach the current collector. In the present embodiment, the active material is a coated active material. However, even in a case in which the coating agent is in contact with a conductive path, the conductive path can be regarded as being in contact with the active material.

In an active material layer without such a conductive path, electrons have to pass through an active material, which is not highly electronically conductive, and thus they are less likely to smoothly reach the current collector. Furthermore, in a case in which electrons are conducted via a conduction assisting agent consisting of particulates, there is electrical resistance between the particles. Thus, since the particles of the conduction assisting agent are not continuously joined to one another, electrons unavoidably pass through regions with high electrical resistance. Electrons are thus less likely to smoothly reach the current collector.

Furthermore, in the foregoing description, the movement of electrons is described referring to a case in which electrons generated from the positive electrode active material flow to the current collector. However, electrons flowing from the current collector to the positive electrode active material can also pass through conductive paths and smoothly reach the positive electrode active material. That is, the same effects can be obtained in charging and discharging.

The conduction assisting agent 16 is selected from materials with conductivity. Details of the conduction assisting agent will be described later. Further, in the present embodiment, the conduction assisting agent 16 is contained in the coating agent 151, but it may be in contact with the positive electrode active material 14. If the conduction assisting agent 16 is contained in the coating agent 151 or in contact with the positive electrode active material 14, electron conductivity from the positive electrode active material 14 to arrival at the conductive path can be further enhanced.

Regarding the embodiment of FIG. 3, explanations are given by having a positive electrode as an example. However, in the case of a negative electrode, a negative electrode active material may be used as an active material instead of a positive electrode active material. Details of the negative electrode active material will be also described later.

Also in the negative electrode, the conductive path is in contact with negative electrode active material around the conductive path. As in the case of the positive electrode, electrons generated from the negative electrode active material quickly reach the conductive path and pass through the conductive path smoothly to the current collector. Similarly, electrons flowing from the current collector to the negative electrode active material can smoothly reach the negative electrode active material.

Figure 4:
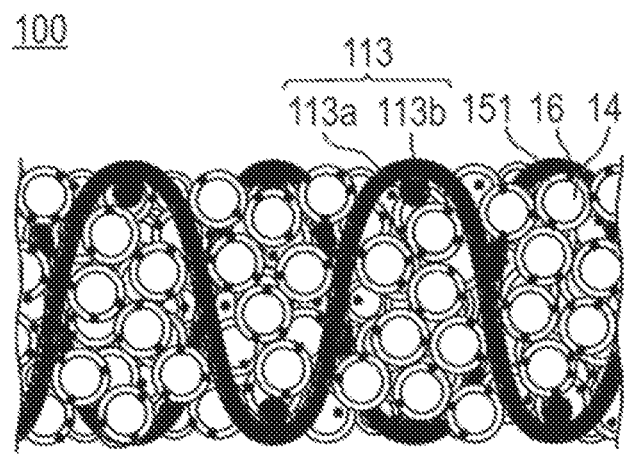
FIG. 4 is a cross-sectional view schematically illustrating other exemplary embodiment of the positive electrode active material layer.

FIG. 4 is a cross-sectional view schematically illustrating other exemplary embodiment of the positive electrode active material layer.

In the positive electrode active material layer 100 of the embodiment illustrated in FIG. 4, the conductive member is a conductive fiber 113 which constitutes part of a woven fabric. The woven fabric is composed of warp yarns 113a and weft yarns 113b formed of the conductive fiber. The positive electrode active material layer 100 according to the embodiment illustrated in FIG. 4 has the same configuration as the positive electrode active material layer 100 according to the embodiment illustrated in FIG. 2, except that a fabric-form fiber structure corresponding to the non-woven fabric in FIG. 3 is a woven fabric. The method for weaving a woven fabric is not particularly limited, and examples of the usable woven fabrics include those woven by plain weaving, twill weaving, satin weaving, or pile weaving. It is also possible to use, instead of a woven fabric, a knitted fabric composed of a conductive fiber. Furthermore, the method for knitting a knitted fabric is not particularly limited, and examples of the usable knitted fabrics include those knitted by weft knitting, warp knitting, or circular knitting. Similar to the non-woven fabric, the woven fabric and the knitted fabric have many voids between the conductive fibers constituting them. As such, an electrode (active material layer) can be formed by filling the voids with a coated active material.

Furthermore, at least a part of the conductive fiber 113 has a portion extending to the first principal surface 111 and another portion extending to the second principal surface 121. Thus, at least a part of the conductive fiber 113 forms a conductive path that electrically connects the first principal surface 111 and the second principal surface 121.

Other constitutions including type of preferred conductive fiber and type of preferred active material are the same as those of the embodiment illustrated in FIG. 2, and thus the detailed explanation therefor is omitted here. Furthermore, by having a negative electrode active material as the active material, a negative electrode can be prepared.

Figure 5:
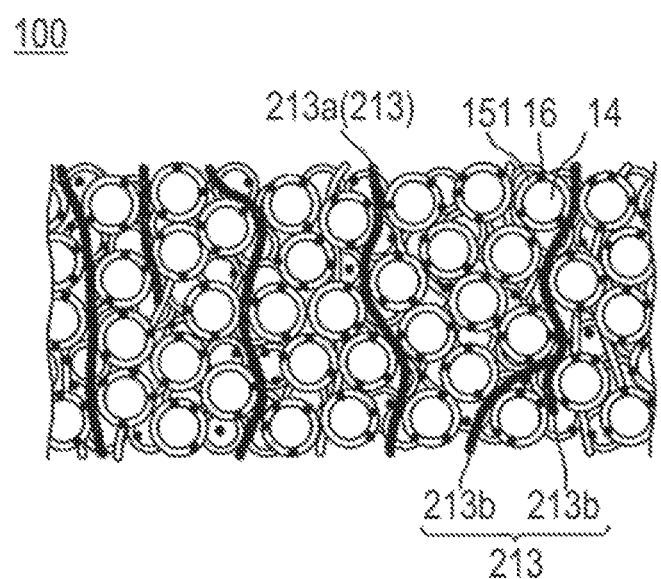
FIG. 5 is a cross-sectional view schematically illustrating other exemplary embodiment of the positive electrode active material layer.

FIG. 5 is a cross-sectional view schematically illustrating other exemplary embodiment of the positive electrode active material layer.

In a positive electrode active material layer 100 according to the embodiment illustrated in FIG. 5, the conductive member is a conductive fiber 213 dispersed between the first principal surface 111 and the second principal surface 121. The conductive fiber 213 is not part of a structural body formed of conductive fiber, such as the non-woven fabric, the woven fabric, or the knitted fabric illustrated in FIG. 3 and FIG. 4. The method for manufacturing a positive electrode active material layer of the embodiment illustrated in FIG. 5 will be described later in detail. According to the embodiment, production is made by using a slurry containing the conductive fiber and the coated active material, in which the conductive fibers are dispersed in the active material layer, and it should not be regarded as one in which voids among fibers are filled with a coated active material.

At least part of the conductive fiber 213 has a portion extending to the first principal surface 111 and another portion extending to the second principal surface 121. In other words, at least a part of the conductive fiber 213 forms a conductive path that electrically connects the first principal surface 111 to the second principal surface 121.

In FIG. 5, the fiber represented by the conductive fiber 213a is an example in which one conductive fiber serves as a conductive path while the two fibers represented by the conductive fiber 213b are an example in which two conductive fibers serve as a conductive path as they are in contact with each other.

Other constitutions including type of preferred conductive fiber and type of preferred active material are the same as those of the embodiment illustrated in FIG. 2, and thus the detailed explanation therefor is omitted here. Furthermore, by having a negative electrode active material as the active material, a negative electrode can be prepared.

In the embodiment illustrated in FIG. 5, the conductive fiber as the conductive member and the coated active material may be fixed onto a film such that the fixed shape can be retained loosely to the extent that they do not flow. If the film is made of a material having high conductivity (conductive material), the film can be used as a current collector. In addition, the conductivity is not inhibited even if the film contacts with a current collector, and therefore desirable. It is noted that the film is not illustrated in FIG. 5. The production method in which the conductive fiber as the conductive member and the coated active material are fixed onto the film will be described later in detail.

In another separate embodiment, the conductive fiber as the conductive member and the coated active material may be fixed by a resin to keep the conductive fiber dispersed in the active material in a lithium ion battery.

Figure 6:
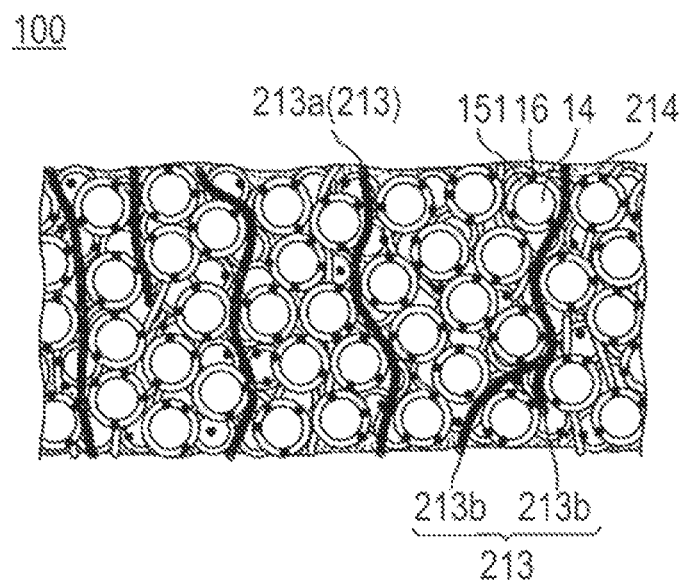
FIG. 6 is a cross-sectional view schematically illustrating other exemplary embodiment of the positive electrode active material layer.

FIG. 6 is a cross-sectional view schematically illustrating other exemplary embodiment of the positive electrode active material layer.

The positive electrode active material layer 100 of the embodiment illustrated in FIG. 6 has the same constitution as that according to the embodiment illustrated in FIG. 5 except that the conductive fiber 213 as the conductive member and positive electrode active material 14 (coated active material) as the active material are fixed by a resin 214.

Examples of the resin include vinyl resins, urethane resins, polyester resins, and polyamide resins.

The production method in which a conductive fiber as conductive member and a coated active material are fixed by a resin will be explained later in detail.

Figure 7:
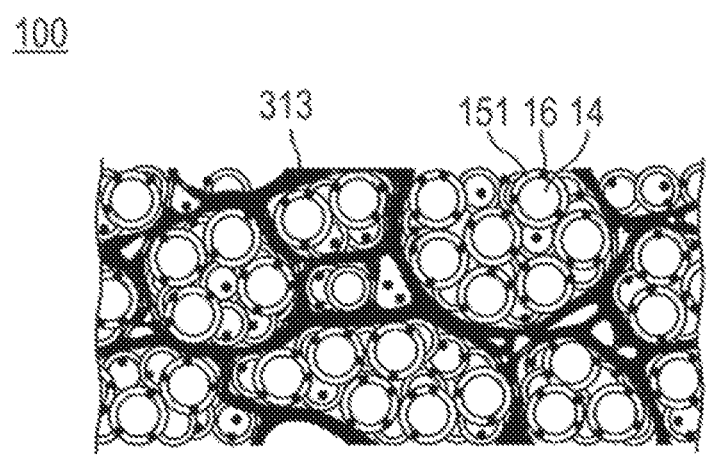
FIG. 7 is a cross-sectional view schematically illustrating other exemplary embodiment of the positive electrode active material layer.

FIG. 7 is a cross-sectional view schematically illustrating other exemplary embodiment of the positive electrode active material layer.

In the embodiments illustrated in FIG. 7, the conductive member is a resin 313 prepared by conduction treatment and constituting a part of a foamed resin. The foamed resin has many voids. As such, an electrode can be formed by filling the voids with a coated active material.

The resin prepared by conduction treatment may be, for example, a resin provided with conductivity obtained by forming a conductive thin film on the surface of a resin, or a resin provided with conductivity obtained by mixing a resin with a conductive filler such as a metal or carbon fiber. The resin itself may be a conductive polymer or a resin in which the conductive polymer is further provided with conductivity.

Examples of a method for forming a conductive thin film on the surface of a resin include metal plating, a deposition treatment, or a sputtering treatment.

In the embodiment illustrated in FIG. 7, the resin 313 provided with conductivity is continuous from the first principal surface 111 to the second principal surface 121. The resin 313 provided with conductivity forms a conductive path that electrically connects the first principal surface 111 to the second principal surface 121.

The foamed resin including the resin provided with conductivity is preferably a resin foam, such as a polyurethane foam, a polystyrene foam, a polyethylene foam, or a polypropylene foam. In particular, the foamed resin is preferably a polyurethane foam whose surface is plated with a metal such as nickel.

In a preferred embodiment of the present invention, if the conductive member is a foamed resin including a resin provided with conductivity, the foamed resin including a resin provided with conductivity preferably has an electrical conductivity of 100 mS/cm or more. The electrical conductivity of the foamed resin can be determined by the four-terminal method. As the foamed resin including a resin provided with conductivity has an electrical conductivity of 100 mS/cm or more, the conductive paths that are formed of the conductive fiber and connect the first principal surface to the second principal surface have small electrical resistance. This advantageously enables smooth transfer of electrons from the active material far from the current collector, and therefore desirable. Furthermore, by having a negative electrode active material as the active material, a negative electrode can be prepared.

In the positive electrode active material according to a preferred embodiment of the present invention, including the embodiments illustrated in FIGS. 3 to 7, the proportion by volume of the conductive member is preferably 0.1 to 15% by volume based on the volume of the positive electrode active material layer. In other words, the volume of the conductive member in the positive electrode active material layer is preferably relatively small. A small volume of the conductive member indicates that voids not occupied by the conductive member can be filled with a large number of coated active materials. By filling the voids with a large number of coated active materials, an electrode with high capacity can be obtained. Furthermore, in the present example, the proportion by volume of the conductive member is about 2% by volume.

Furthermore, in a preferred embodiment of the present invention, the proportion by volume of the coated active material is preferably 30 to 80% by volume based on the volume of the active material layer. As the proportion of the coated active material is large, the electrode can have high capacity. Furthermore, in the present example, the proportion by volume of the conductive member is about 46% by volume.

Explanations are further given regarding the method for manufacturing a non-aqueous electrolyte secondary battery according to a preferred embodiment of the present invention.

The method for manufacturing a non-aqueous electrolyte secondary battery according to a preferred embodiment of the present invention is a method for manufacturing a non-aqueous electrolyte secondary battery having a power generating element including two electrodes having different polarity and formed by forming an active material layer on a current collector; and an electrolyte layer placed between the electrodes, in which at least one of the active material layers of the two electrodes having different polarity contains an active material and a conductive member made from an electron conducting material, and the active material layer has a first principal surface which comes into contact with the electrolyte layer side, and a second principal surface which comes into contact with the current collector side, at least a part of the conductive member forms a conductive path electrically connecting the first principal surface to the second principal surface, and the conductive path is in contact with the active material in the periphery of the conductive path, at least a part of the surface of the active material is coated with a coating agent that includes a coating resin and a conduction assisting agent, and the electrolyte solution contained in the two electrodes having different polarity or the electrolyte layer is a gel phase electrolyte.

Regarding the method for manufacturing a non-aqueous electrolyte secondary battery according to this embodiment, explanations are given first for the method for producing an electrode (active material layer) based on several separate modes.

One mode of the producing an electrode (active material layer) of the non-aqueous electrolyte secondary battery of the present invention includes a step of preparing a structural body which includes a conductive member, has plural voids therein, and is provided with the first principal surface and the second principal surface, a step of applying the first principal surface or the second principal surface of the structural body with a slurry containing the coated active material, and a step of filling the voids of the structural body with the coated active material under increased or reduced pressure.

The production method of the above mode is suitable for producing an active material layer of a mode which has been explained in view of FIG. 3, FIG. 4, or FIG. 7.

First, a structural body which includes a conductive member, has plural voids therein, and is provided with the first principal surface and the second principal surface is prepared (i.e., the structural body becomes a skeleton of the first principal surface and the second principal surface of an active material layer).

The structural body which may be used is preferably a non-woven fabric including the conductive member made of conductive fiber, a woven fabric or knitted fabric including the conductive member made of conductive fiber, or a foamed resin including the conductive member made of a resin provided with conductivity. The descriptions of the non-woven fabric, woven fabric, knitted fabric, and foamed resin are the same as those described in the above, and thus are omitted here.

Figure 8:
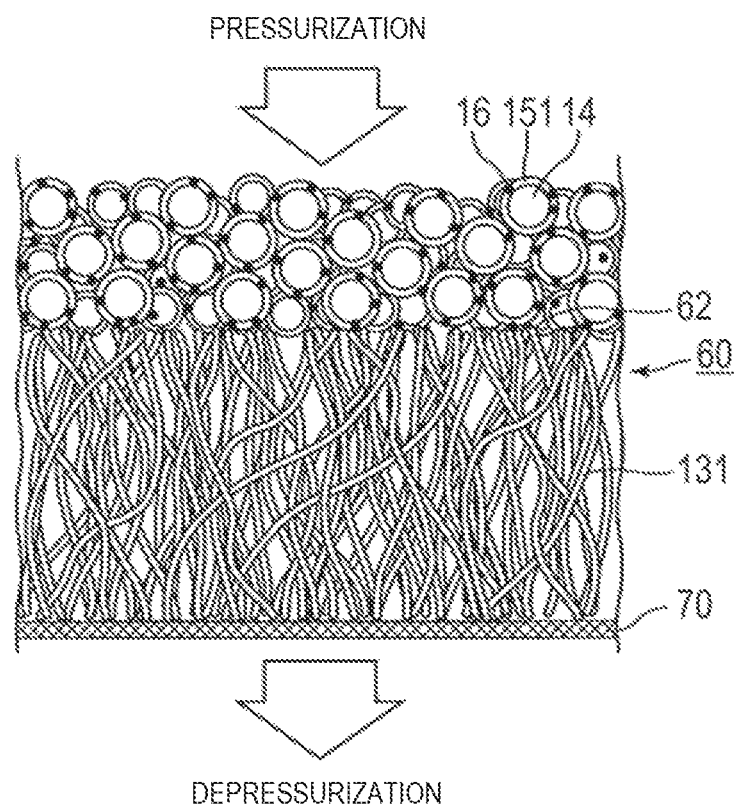
FIG. 8 is a process flow chart schematically illustrating the process of filling an active material in voids of a structural body.
Figure 8:
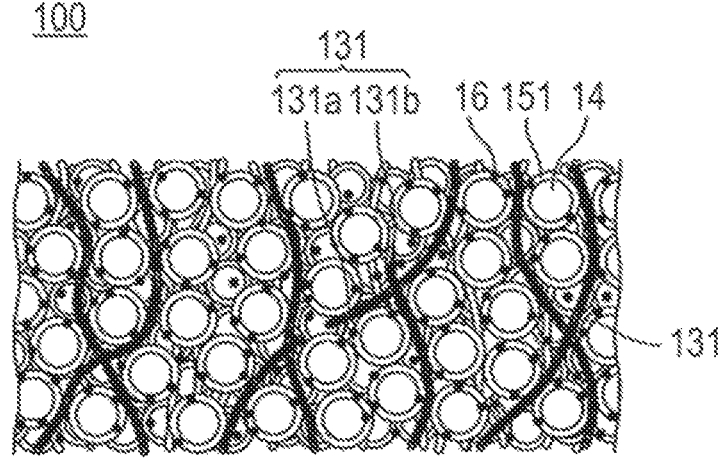

FIGS. 8(a) and 8(b) illustrate a step of filling voids in a structural body with coated active material. These figures illustrate an embodiment in which a non-woven fabric is used as a structural body.

Next, a slurry containing the coated active material is applied to the first principal surface or the second principal surface of the structural body.

The active material is coated by a coating agent to yield a coated active material. The method for producing a coated active material will be described later.

The slurry containing the active material may be either a solvent slurry containing a solvent or an electrolyte solution slurry containing an electrolyte solution. Furthermore, the explanations regarding the slurry can be also applied to other embodiments.

Examples of the solvent include water, propylene carbonate, 1-methyl-2-pyrrolidone (N-methyl pyrrolidone), methyl ethyl ketone, dimethyl formamide, dimethyl acetamide, N,N-dimethylaminopropylamine, and tetrahydrofuran.

Furthermore, as an electrolyte solution, an electrolyte solution containing supporting salts and/or organic solvent, which is used for manufacture of a lithium ion battery, can be used. As for the supporting salts, those generally used for manufacture of a lithium ion battery can be used, and as for the organic solvent, those generally used for an electrolyte solution can be used. Meanwhile, the electrolyte solution to be contained in the electrode or the electrolyte layer needs to be gellated by a gelling agent. Furthermore, the supporting salts and organic solvent may be used either singly or in combination of two or more types thereof.

The slurry is prepared by dispersing a coated active material, and if necessary, a conduction assisting agent to a concentration of 5 to 60% by weight based on the weight of a solvent or an electrolyte solution followed preparing them in a slurry.

The slurry containing the coated active material can be applied to the first principal surface or the second principal surface of the structural body using any coating device like a bar coater and a brush.

FIG. 8(a) schematically illustrates a slurry applied to a second principal surface of a non-woven fabric as a structural body. A slurry containing the positive electrode active material 14, which is obtained by coating with a coating agent 151, is applied to a second principal surface 62 of a non-woven fabric 60.

Subsequently, the voids in the structural body are filled with the coated active material by pressurization or depressurization.

The pressurization may be performed by pressing from above the coating surface with the slurry using a pressing machine. The depressurization may be performed by suction using a vacuum pump with filter paper or mesh in contact with the surface of the structural body to which the slurry is not applied.

Because the structural body has voids, by the pressurization or depressurization, the voids in the structural body can be filled with the coated active material, FIG. 8(a) shows an arrow indicating the direction of pressurization from above a coating surface with a slurry and an arrow indicating the direction of depressurization from below filter paper 70. FIG. 8(b) illustrates the positive electrode active material layer 100 in which voids in the structural body are filled with the coated active material. The positive electrode active material layer 100 illustrated in FIG. 8(b) is the same as the positive electrode active material layer 100 illustrated in FIG. 3.

If the slurry containing the coated active material is a solvent slurry containing a solvent, a step of distilling the solvent is further preferably performed thereafter.

Furthermore, if the slurry containing the coated active material is an electrolyte solution slurry containing an electrolyte solution, the voids in the structural body are fully filled with the coated active material and the electrolyte solution. Such a configuration is preferable as an electrode for lithium ion batteries. Meanwhile, the electrolyte solution to be contained in the electrode or the electrolyte layer needs to be gellated by a gelling agent.

Also in a case in which the structural body is not a non-woven fabric but a woven fabric or knitted fabric containing the conductive member or a foamed resin including a resin provided with conductivity, an active material layer can be produced by filling the coated active material into the voids in the structural body by the above step.

Another aspect of the present invention includes a step of applying a slurry containing the conductive member and the coated active material to a film and a step of fixing the coated active material and conductive member on a film under pressurization or depressurization.

The method according to this aspect is suitable for producing the positive electrode active material layer according to the embodiment which has been explained by using FIG. 5.

Figure 9:
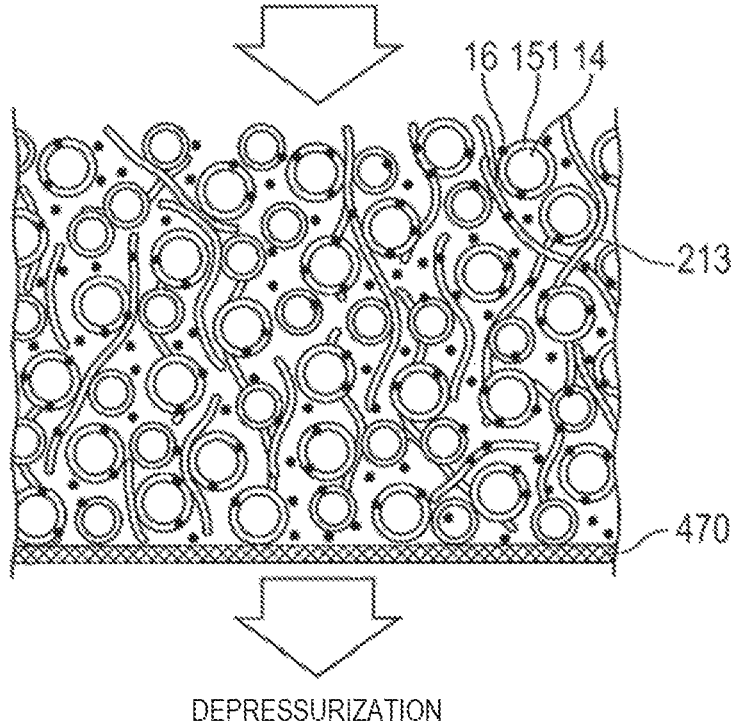
FIG. 9 is a process flow chart schematically illustrating the process of fixing the active material and a conductive member on top of a film.
Figure 9:
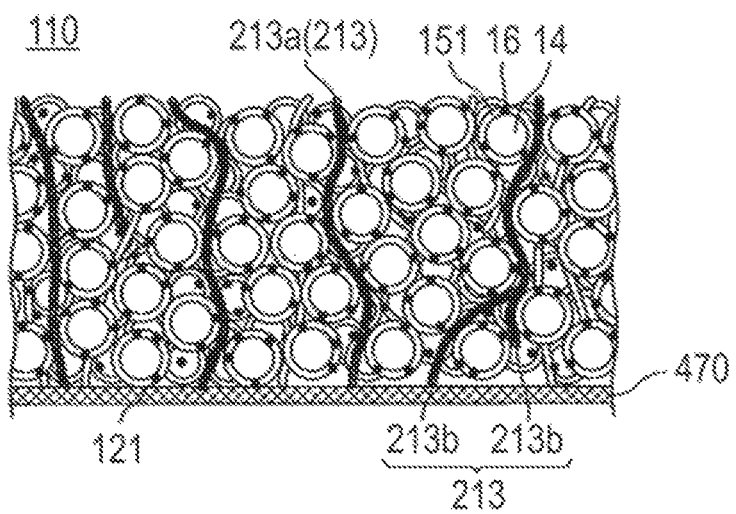

FIGS. 9(a) and 9(b) schematically illustrate a step of fixing the coated active material and conductive member onto a film.

First, the slurry containing a conductive member 213, and a coated active material, which is a positive electrode active material 14 obtained by coating with a coating agent 151 containing a coating resin and a conduction assisting agent 16, is applied on a film 470.

The slurry may be, for example, a slurry obtained by further adding and dispersing conductive fiber as the conductive member into the slurry described above.

The conductive fiber may be any of the conductive fiber described in the above. As for the shape of the conductive fiber, the conductive fiber is preferably independent from one another. They preferably do not have a three-dimensional structure such as a non-woven fabric, a woven fabric, or a knitted fabric. If conductive fibers are independent from one another, the fiber is dispersed in the slurry.

In this embodiment, the slurry may be an electrolyte solution slurry containing an electrolyte solution. The electrolyte solution which is the same as the electrolyte solution for the electrolyte solution slurry described above can be used. The slurry may be a solvent slurry containing a solvent. Meanwhile, the electrolyte solution to be contained in the electrode or the electrolyte layer needs to be gellated by a gelling agent.

The film 470 is preferably a film capable of separating the coated active material and the conductive member from the electrolyte solution and the solvent in the subsequent pressurization or depressurization step. If the film is made of a material having high conductivity (conductive material), the film can substitute for the current collector. In addition, the conductivity is not inhibited even if the film contacts with the current collector, and therefore desirable. For example, a material with an electrical conductivity of 100 S/cm or more can be suitably used. Examples of materials with such properties which can be used include filter paper containing conductive fiber such as carbon fiber and metal mesh. Those can be used as a current collector.

The metal mesh which may be used is preferably made of stainless steel mesh. Examples of such a metal mesh include SUS316-made twilled Dutch weave wire mesh (available from Sunnet Industrial Co., Ltd.). The metal mesh preferably has an opening size that does not allow the coated active material or the conductive member to pass through the mesh. For example, a metal mesh of 2300 mesh is preferably used.

In the present embodiment, the slurry can be applied to the film with any coating device like a bar coater and a brush.

FIG. 9(a) schematically illustrates a slurry applied to a film. A slurry containing the coated active material and conductive fiber 213 is applied to a filter paper 470 as a film.

Next, the coated active material and the conductive member are fixed onto the film by pressurization or depressurization.

The pressurization or the depressurization can be performed in the same manner as in the step described above. By the pressurization or depressurization, the electrolyte solution or the solvent is removed from the slurry, and the conductive fiber as the conductive member and the coated active material are fixed onto the film such that the fixed shape is retained loosely to the extent that they do not flow.

FIG. 9(b) illustrates a positive electrode active material layer 110 in which the conductive fiber 213 as the conductive member and the coated active material are fixed on the filter paper 470.

If the film in the positive electrode active material layer 110 is made of a conductive material, the film can substitute for a current collector. Alternatively, the film and a current collector may be brought into contact so that they can serve as one current collector. Accordingly, a second principal surface 121 in the positive electrode active material layer 110 can be defined as a portion in which the conductive fiber 213 as the conductive member contact with the filter paper 470.

If the film is made of a non-conductive material, the film is preferably disposed on the separator side. Alternatively, the film may be used as a separator. Examples of the film made of a non-conductive material include an aramid separator (manufactured by Japan Vilene Company, Ltd.).

Furthermore, in the present embodiment, if the slurry is an electrolyte solution slurry containing an electrolyte solution, the film is preferably a film impermeable to the coated active material but permeable to the electrolyte solution, and the electrolyte solution is preferably allowed to pass through the film by pressurization or depressurization so as to be removed.

It is also preferable that a press step of pressurizing the slurry at a higher pressure is performed.

In the press step, the pressure difference is greater than that in the pressurization or depressurization in previous step in order to improve the density of the coated active material.

The press step has a concept which encompasses both pressurization in a case in which depressurization is performed in previous step and pressurization at a higher pressure in a case in which pressurization is performed in previous step.

Pressure for the press step can be suitably set, but it is preferably 1 to 5 kg/cm$^2$ or so, for example.

Furthermore, by performing a step of transferring the coated active material fixed onto the film to a principal surface of a current collector or a separator so as to arrange a first principal surface of the active material layer on the principal surface of the separator or produce an electrode having a second principal surface of the active material layer on the principal surface on the current collector.

Regarding the transferring step, it is preferable that the transfer is carried out by bringing a principal surface opposite the film into contact with a principal surface of a current collector or a separator.

If the film is made of a conductive material and the film is used as a current collector, the transfer is preferably carried out by bringing a principal surface opposite the film into contact with a principal surface of a separator. Furthermore, if the film is not used as a current collector, a step of removing the film is preferably performed after carrying out the transfer. Alternatively, the film may be used as part of a separator.

Figure 10:
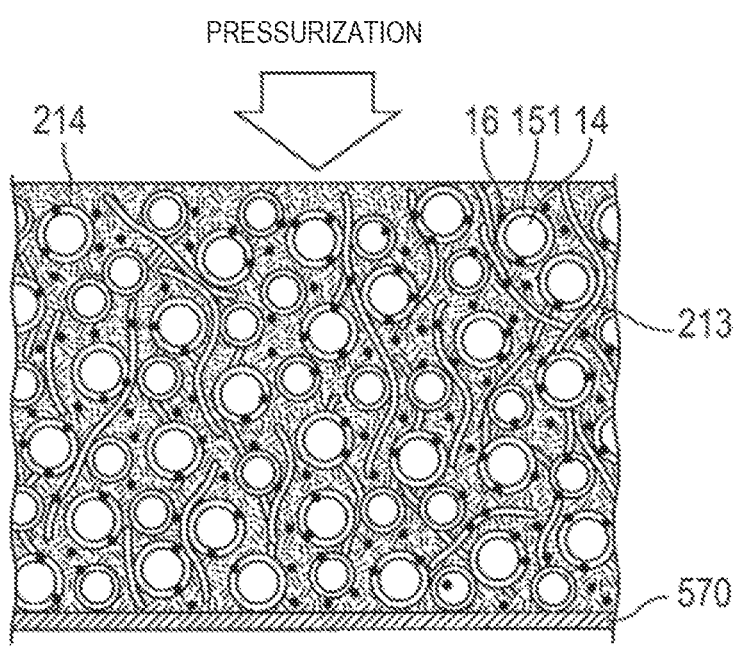
FIG. 10 is a process flow chart schematically illustrating the process of fixing the active material and the conductive member using a resin.
Figure 10:
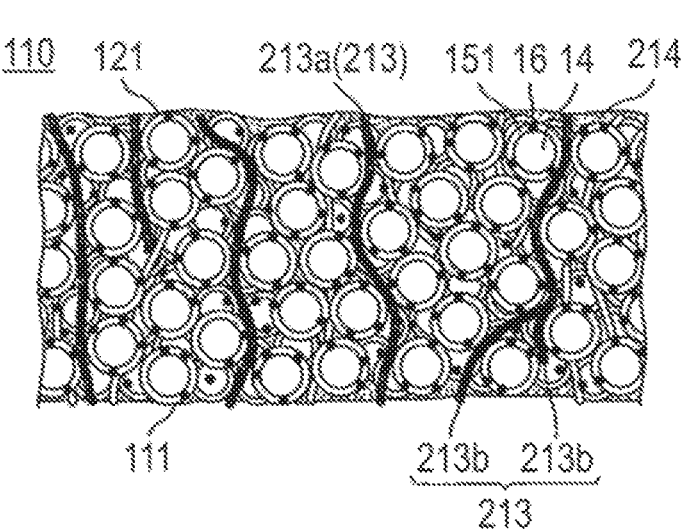

FIGS. 10(a) and 10(b) schematically illustrate a step of fixing the coated active material and conductive member using a resin.

First, a composition for active material containing the conductive member, coated active material, and resin is prepared.

As for the conductive member, similar to the embodiment which has been explained in view of FIGS. 9(a) and 9(b), it is preferable to use the conductive fiber having a shape in which each fiber is independent from one another.

Preferred examples of the resin include vinyl resins, urethane resins, polyester resins, and polyamide resins. These resins are preferred from the viewpoint of moldability.

In the composition for an active material, the resin may be in the form of a resin solution dissolved in a solvent or in the form of solid, such as a pellet that is fluidized when heated.

Furthermore, the resin may be a coating resin which is included in a coating agent.

In the composition for an active material, if the resin is present in the form of a resin solution having a resin dissolved in a solvent, the conductive member and the active material are preferably dispersed in the resin solution. Also in a case in which the resin is in the form of solid, the resin, the conductive member, and the active material are preferably dispersed, not localized in a particular part.

The composition for an active material thus prepared is hot-pressed so that the conductive member and the active material are fixed by the resin.

The method for hot-press is not particularly limited. For example, a method in which the composition for an active material containing a coated active material, a conductive fiber 213, and a resin 214 is applied to a plate 570 such as a metal plate illustrated in FIG. 10(a) followed by hot-press from the upper surface can be mentioned.

The composition for an active material may be applied by any application device like a bar coater and a brush. The hot-pressing may be performed using a usual hot-pressing device.

Furthermore, in a case in which the resin is the resin for coating the coated active material, when the conductive member and the coated active material are applied to a plate and hot-pressed, the conductive member and the (coated) active material are fixed by coating resin melted by heat.

The active material fixed by the coating resin may be coated active material that remains coated with the coating resin or may be active material from which the coating has been somewhat peeled off.

The conditions for the hot-pressing may be determined according to the curing conditions of the resin to be used and are not particularly limited. For a urethane resin, for example, the hot-pressing is preferably performed at 100° C. to 200° C. and 0.01 to 5 MPa for 5 to 300 seconds. For a vinyl resin, the hot-pressing may be performed at 80° C. to 180° C. and 0.01 to 5 MPa for 5 to 300 seconds.

According to hot-pressing, as illustrated in FIG. 10(b), a positive electrode active material layer 110 in which the conductive fiber 213 and the coated active material are fixed by a resin 214 can be produced.

(Positive Electrode Active Material)

Examples of the positive electrode active material 14 include complex oxides of lithium and transition metals (e.g., $LiCoO_2$, $LiNiO_2$, $LiMnO_2$ and $LiMn_2O_4$), transition metal oxides (e.g., $MnO_2$ and $V_2O_5$), transition metal sulfides (e.g., $MoS_2$ and $TiS_2$), and conductive polymers (e.g., polyaniline, polyvinylidene fluoride, polypyrrole, polythiophene, polyacetylene, poly-p-phenylene, and polycarbazole)

(Negative Electrode Active Material)

Examples of the negative electrode active material 24 include graphite, amorphous carbon, calcined products of polymer compounds (e.g., products obtained by calcining and carbonizing phenolic resins or furan reins), cokes (e.g., pitch coke, needle coke, petroleum coke), carbon fiber, conductive polymers (e.g., polyacetylene, polypyrrole), tin, silicon, and metal alloys (e.g., lithium-tin alloy, lithium-silicon alloy, lithium-aluminum alloy, lithium-aluminum-manganese alloy).

(Coating Agent)

As described above, according to an embodiment of the present invention, at least one of the positive electrode active material layer and the negative electrode active material layer includes a conductive material composed of an electron conducting material and an active material. According to this embodiment, at least a part of the surface of the active materials is coated with a coating agent 151 including a coating resin and a conduction assisting agent 16.

(Conduction Assisting Agent)

The conduction assisting agent 16 is selected from materials with conductivity.

Specific examples thereof include, but not limited to, metals [e.g., aluminum, stainless steel (SUS), silver, gold, copper, titanium], carbon [e.g., graphite, carbon blacks (acetylene black, Ketjen black, furnace black, channel black, thermal lamp black)], and mixtures thereof.

These conduction assisting agents may be used either singly or two or more thereof may be used in combination. Alloys or metal oxides thereof may be used. From the viewpoint of the electrical stability, aluminum, stainless steel, carbon, silver, gold, copper, titanium, and mixtures thereof are preferred, silver, gold, aluminum, stainless steel, and carbon are more preferred, and carbon is still more preferred. The conduction assisting agent may be a particulate ceramic material or resin material coated with a conductive material (any of the metals mentioned above as conductive materials) by plating, for example.

Shape (form) of the conduction assisting agent is not limited to a particle form, and it may be the form other than particle form or the form like carbon tube or the like which is available as a so-called filter type conductive resin composition.

From the viewpoint of the electric characteristics of a battery, the average particle diameter (i.e., primary particle diameter) of a conduction assisting agent is preferably 0.01 to 10 μm, although it is not particularly limited thereto. Furthermore, in the present specification, the "particle diameter" means the maximum distance L among the distances between any two points on a contour of a conduction assisting agent. Values of "average particle diameter" indicate the values that are determined by using an observation means like scanning type electron microscope (SEM) or a transmission type electron microscope (TEM) and calculating the average value of particle diameter of particles that are observed from several to several tens of fields of view.

(Coating Resin)

According to a preferred embodiment of the present invention, the resin for coating an active material (hereinbelow, also simply referred to as a "coating resin") has tensile elongation at break of 10% or higher in a saturated liquid absorption state.

The tensile elongation at break in a saturated liquid absorption state can be measured as follows: the coating resin is punched into a dumbbell shape; the dumbbell-shaped coating resin is immersed in an electrolyte solution at 50° C. for 3 days so as to have the coating resin in a saturated liquid absorption state; and the tensile elongation at break is measured according to ASTM D683 (specimen's shape: Type II). The tensile elongation at break is the rate of elongation until the test specimen breaks in a tensile test as calculated by the following formula:

Tensile elongation at break (%)=[(Length of test specimen at break−Length of test specimen before test)/Length of test specimen before test]×100

When the tensile elongation at break of a coating resin is 10% or more in a saturated liquid absorption state, the coating resin has adequate flexibility, so that it is possible to alleviate the volume change of the electrode and suppress expansion of the electrode according to coating with an active material. The tensile elongation at break is more preferably 20% or more, and even more preferably 30% or more. Furthermore, the upper limit value of the tensile elongation at break is preferably 400%, and more preferred upper limit value is 300%.

Furthermore, a urethane resin obtained by reacting an active hydrogen component with an isocyanate component is also preferred as a coating resin. Because the urethane resin has flexibility, it is possible to alleviate the volume change of the electrode and suppress expansion of the electrode according to coating the active material of a lithium ion battery with a urethane resin.

According to a preferred embodiment of the present invention, the coating resin has a liquid absorption rate of 10% or more when immersed in an electrolyte solution and has a tensile elongation at break of 10% or more in a saturated liquid absorption state.

The liquid absorption rate when immersed in an electrolyte solution can be determined by measuring the weight of the coating resin before and after immersion in the electrolyte solution and using the following formula.

Liquid absorption rate (%)=[(Weight of coating resin after immersion in electrolyte solution−Weight of coating resin before immersion in electrolyte solution)/Weight of coating resin before immersion in electrolyte solution]×100

The electrolyte solution to be used to determine the liquid absorption rate is an electrolyte solution in which $LiPF_6$ as an electrolyte is dissolved to a concentration of 1 mol/L in a mixed solvent in which ethylene carbonate (EC) and diethyl carbonate (DEC) are mixed in a volume ratio (EC: DEC) of 3:7.

To determine the liquid absorption rate, the coating resin is immersed in the electrolyte solution at 50° C. for 3 days. The coating resin will be in saturated liquid absorption state after being immersed in the electrolyte solution at 50° C. for 3 days. The expression "saturated liquid absorption state" refers to the state in which the weight of the coating resin does not increase anymore even if the coating resin is immersed in the electrolyte solution for a longer time.

As the liquid absorption rate is 10% or more, the electrolyte solution is sufficiently absorbed in the coating resin, and lithium ions can easily pass through the coating resin, so that the movement of lithium ions between the active material and the electrolyte solution is not hindered. The liquid absorption rate is preferably 20% or more, more preferably 30% or more. Furthermore, the upper limit value of the liquid absorption rate is preferably 400%, more preferably 300%.

The conductivity of lithium ions in the resin for coating an active material of an embodiment of the present invention can be determined by measuring, according to an alternating current impedance method, the conductivity of the coating resin at room temperature after the coating resin is set in saturated liquid absorption state.

The conductivity of lithium ions determined by the above method is preferably 1.0 to 10.0 mS/cm. With the conductivity in this range, the lithium ion battery can exhibit sufficient performance.

Furthermore, according to another embodiment, the coating resin is preferably a urethane resin having a liquid absorption rate of 10% or more when immersed in an electrolyte solution and having a tensile elongation at break of 10% or more in a saturated liquid absorption state, in which the urethane resin is obtained by reacting an active hydrogen component with an isocyanate component.

The active hydrogen component preferably contains at least one selected from the group consisting of polyether diols, polycarbonate diols, and polyester diols.

Examples of polyether diols include polyoxyethylene glycol (hereinbelow, abbreviated as "PEG"), polyoxyethylene oxypropylene block copolymer diol, polyoxyethylene oxytetramethylene block copolymer diol; ethylene oxide adducts of low molecular weight glycols such as ethylene glycol, propylene glycol, 1,4-butane diol, 1,6 hexamethylene glycol, neopentyl glycol, bis(hydroxymethyl)cyclohexane, and 4,4'-bis(2-hydroxyethoxy)-diphenyl propane; condensed polyether ester diol obtained by reaction of PEG having a number average molecular weight of 2,000 or less with at least one dicarboxylic acid [such as aliphatic dicarboxylic acids having a carbon number of 4 to 10 (e.g., succinic acid, adipic acid, and sebacic acid) and aromatic dicarboxylic acids having a carbon number of 8 to 15 (e.g., terephthalic acid and isophthalic acid)]; and mixtures of two or more thereof.

In a case in which polyether diol contains oxyethylene units, the amount of oxyethylene units is preferably 20% by weight or more, more preferably 30% by weight or more, still more preferably 40% by weight or more. Furthermore, examples also include polyoxypropylene glycol, polyoxytetramethylene glycol (hereinbelow, abbreviated as "PTMG"), and polyoxypropylene oxytetramethylene block copolymer diol. Preferred among them are PEG, polyoxyethylene oxypropylene block copolymer diol, and polyoxyethylene oxytetramethylene block copolymer diol, with PEG being particularly preferred. Furthermore, polyether diol may be used either singly or a mixture of two or more thereof may be used.

Examples of polycarbonate diols include polyhexamethylene carbonate diol. Examples of polyester diols include a condensed polyester diol obtained by reaction of at least one of a low molecular weight diol or a polyether diol having a number average molecular weight of 1,000 or less with at least one of the dicarboxylic acids mentioned above; and a polylactone diol obtained by ring-opening polymerization of a lactone having a carbon number of 4 to 12. Examples of the low molecular weight diol include the low molecular weight glycols mentioned above as examples of the polyether diol. Examples of the polyether diol having a number average molecular weight of 1,000 or less include polyoxypropylene glycol and PTMG. Examples of the lactone include ε-caprolactone and γ-valerolactone. Specific examples of the polyester diol include polyethylene adipate diol, polybutylene adipate diol, polyneopentylene adipate diol, poly(3-methyl-1,5-pentylene adipate) diol, polyhexamethylene adipate diol, polycaprolactone diol, and mixtures of two or more thereof.

The active hydrogen component may also be a mixture of two or more selected from the polyether diols, polycarbonate diols, and polyester diols.

Preferably, the active hydrogen component essentially contains a high molecular weight diol having a number average molecular weight of 2,500 to 15,000. Examples of the high molecular weight diol include the polyether diols, polycarbonate diols, and polyester diols.

The high molecular weight diol having a number average molecular weight of 2,500 to 15,000 is preferred for imparting adequate flexibility to the urethane resin and high strength to a coating formed on the active material. Furthermore, the number average molecular weight of the high molecular weight diol is more preferably 3,000 to 12,500, still more preferably 4,000 to 10,000. The number average molecular weight of the high molecular weight diol) can be calculated from the hydroxyl value of the high molecular weight diol, and the hydroxyl value can be measured in accordance with JIS K1557-1.

Furthermore, it is preferable that the active hydrogen component essentially contains the high molecular weight diol having a number average molecular weight of 2,500 to 15,000, and the solubility parameter (hereinbelow, abbreviated as SP value) of the high molecular weight diol is 8.0 to 12.0 $(cal/cm^3)^{1/2}$. The SP value of the high molecular weight diol is more preferably 8.5 to 11.5 $(cal/cm^3)^{1/2}$, still more preferably 9.0 to 11.0 $(cal/cm^3)^{1/2}$.

The SP value is calculated by the Fedors method. The SP value can be expressed by the following equation:

$$\text{SP value } (\delta) = (\Delta H/V)^{1/2}$$

In the formula, ΔH represents the molar evaporation heat (cal), and V represents the molar volume ($cm^3$).

In addition, the total molar evaporation heat (ΔH) and the total molar volume (V) of the atomic groups described in "POLYMER ENGINEERING AND SCIENCE, 1974, Vol. 14, No. 2, ROBERT F. FEDORS. (pp. 151-153)" can be used for ΔH and V, respectively.

Those having similar SP values are easily mixed together (highly miscible), and those having very different SP values are not easily mixed together. Namely, the SP value is an index of miscibility.

SP value of 8.0 to 12.0 $(cal/cm^3)^{1/2}$ of polymer diol is preferable from the viewpoint of liquid absorption of an electrolyte solution by a urethane resin.

It is also preferable that the active hydrogen component essentially contains the high molecular weight diol having a number average molecular weight of 2,500 to 15,000, and the content of the polymer diol is 20 to 80% by weight based on the weight of the urethane resin. The content of the polymer dial is more preferably 30 to 70% by weight, and even more preferably 40 to 65% by weight.

Polymer diol content of 20 to 80% by weight is preferable from the viewpoint of liquid absorption of an electrolyte solution by a urethane resin.

It is also preferable that the active hydrogen component essentially contains a polymer diol having a number average molecular weight of 2,500 to 15,000 and a chain extending agent.

Examples of the chain extending agent include low molecular weight diols having a carbon number of 2 to 10 (e.g., ethylene glycol (hereinbelow, abbreviated as EG), propylene glycol, 1,4-butane diol (hereinbelow, abbreviated as 14BG), diethylene glycol (hereinbelow, abbreviated as DEG), and 1,6-hexamethylene glycol); diamines [aliphatic diamine having a carbon number of 2 to 6 (e.g., ethylenediamine and 1,2-propylenediamine), alicyclic diamine having a carbon number of 6 to 15 (e.g., isophorone diamine and 4,4'-diaminodicyclohexylmethane), aromatic diamines having a carbon number of 6 to 15 (e.g., 4,4'-diaminodiphenylmethane)]; monoalkanolamines (e.g., monoethanolamine); hydrazine or its derivatives (e.g., adipic acid dihydrazide); and mixtures of two or more thereof. Preferred among them are low molecular weight diols, with EG, DEG, and 14BG being particularly preferred.

A preferred combination of the high molecular weight diol and the chain extending agent is a combination of PEG as the high molecular weight diol and EG as the chain extending agent or a combination of a polycarbonate diol as the high molecular weight diol and EG as the chain extending agent.

Preferably, the active hydrogen component contains the high molecular weight diol (a11) having a number average molecular weight of 2,500 to 15,000, a diol (a12) other than the high molecular weight, and the chain extending agent (a13) and the equivalent ratio of (a11) to (a12) {(a11)/(a12)} is 10/1 to 30/1 and the equivalent ratio of (a11) to the total of (a12) and (a13) {(a11)/[(a12)+(a13)]} is 0.9/1 to 1.1/1.

The equivalent ratio of (a11) to (a12) {(a11)/(a12)} is more preferably 13/1 to 25/1, still more preferably 15/1 to 20/1.

The diol other than the high molecular weight diol is not particularly limited as long as it is a diol and it is not included the aforementioned high molecular weight diol and specific examples thereof include a diol having a number average molecular weight of less than 2,500, and a diol having a number average molecular weight of more than 15,000.

Examples of such diol include the polyether diols, polycarbonate diols, and polyester diols that are mentioned above.

Furthermore, a low molecular weight diol which is a diol other than the high molecular weight diol and has a carbon number of 2 to 10 included in the chain extending agent is not included in the diol other than the high molecular weight diol.

Isocyanate conventionally used in the production of polyurethane can be used as the isocyanate component. Examples of such isocyanates include aromatic diisocyanates having a carbon number of 6 to 20 (excluding carbon atoms in NCO groups; the same shall apply hereinbelow), aliphatic diisocyanates having a carbon number of 2 to 18, alicyclic diisocyanates having a carbon number of 4 to 15, araliphatic diisocyanates having a carbon number of 8 to 15, modified forms of these diisocyanates (such as carbodiimide-modified diisocyanate, urethane-modified diisocyanate, and uretdione-modified diisocyanate), and mixtures of two or more thereof.

Specific examples of the aromatic diisocyanates include 1,3- and/or 1,4-phenylene diisocyanate, 2,4- or 2,6-tolylene diisocyanate, 2,4'- or 4,4'-diphenylmethane diisocyanate (hereinbelow, diphenylmethane diisocyanate is abbreviated as "MDI"), 4,4'-diisocyanato biphenyl, 3,3'-dimethyl-4,4'-diisocyanato biphenyl, 3,3'-dimethyl-4,4'-diisocyanato diphenylmethane, and 1,5-naphthylene diisocyanate.

Specific examples of the aliphatic diisocyanates include ethylene diisocyanate, tetramethylene diisocyanate, hexamethylene diisocyanate, dodecamethylene diisocyanate, 2,2,4-trimethyl hexamethylene diisocyanate, lysine diisocyanate, 2,6-diisocyanato methylcaproate, bis(2-isocyanatoethyl)carbonate, and 2-isocyanatoethyl-2,6-diisocyanato hexanoate.

Specific examples of the alicyclic diisocyanate include isophorone diisocyanate, dicyclohexylmethane-4,4'-diisocyanate, cyclohexylene diisocyanate, methylcyclohexylene diisocyanate, bis(2-isocyanatoethyl)-4-cyclohexylene-1,2-dicarboxylate, and 2,5- and/or 2,6-norbornane diisocyanate.

Specific examples of the araliphatic diisocyanate include m- and/or p-xylylene diisocyanate and $\alpha,\alpha,\alpha',\alpha'$-tetramethylxylylene diisocyanate.

Preferred among them are aromatic diisocyanates and alicyclic diisocyanates, more preferred are aromatic diisocyanates, and still more particularly preferred is MDI.

In a case in which the urethane resin contains the high molecular weight diol (a11) and the isocyanate component (a2), a preferred equivalent ratio of (a2)/(a11) is 10 to 30/1, and more preferably 11 to 28/1. If the ratio of the isocyanate component is more than 30 equivalents, the resulting coating will be stiff.

In a case in which the urethane resin contains the high molecular weight diol (a11), the chain extending agent (a13), and the isocyanate component (a2), the equivalent ratio of (a2)/[(a11)+(a13)] is usually 0.9 to 1.1/1, preferably 0.95 to 1.05/1. If the equivalent ratio is outside the above range, the molecular weight of the urethane resin may not be sufficiently high.

The number average molecular weight of the urethane resin is preferably 40,000 to 500,000, and more preferably 50,000 to 400,000. If the number average molecular weight of the urethane resin is less than 40,000, the resulting coating will have low strength, whereas if the number average molecular weight thereof is more than 500,000, the solution of the urethane resin will have high viscosity, and a uniform coating may not be obtained.

The number average molecular weight of the urethane resin is measured by gel permeation chromatography (hereinbelow, abbreviated as GPC) using DMF as a solvent and polyoxypropylene glycol as a standard substance. The sample concentration may be 0.25% by weight; the column solid phase may be one in which each of the following columns is connected together: TSKgel SuperH2000, TSKgel SuperH3000, and TSKgel SuperH4000 (all available from Tosoh Corporation); and the column temperature may be 40° C.

The urethane resin can be produced by reaction of an active hydrogen component with an isocyanate component.

Examples of methods for producing the urethane resin include a one shot method in which the high molecular weight diol and the chain extending agent are used as the active hydrogen components, and the isocyanate component is simultaneously reacted with the high molecular weight diol and the chain extending agent, and a prepolymer method in which the high molecular weight diol and the isocyanate component are reacted first, and the chain extending agent is subsequently reacted.

In addition, the urethane resin can be produced in the presence or absence of a solvent inactive to an isocyanate group. Examples of suitable solvents to be used in the reaction in the presence of a solvent include amide-based solvents [e.g., dimethyl formamide (hereinbelow, abbreviated as DMF), dimethyl acetamide], sulfoxide-based solvents (e.g., dimethyl sulfoxide), ketone-based solvents (e.g., methyl ethyl ketone and methyl isobutyl ketone), aromatic solvents (e.g., toluene and xylene), ether-based solvents (e.g., dioxane and tetrahydrofuran), ester-based solvents (e.g., ethyl acetate and butyl acetate), and mixtures of two or more thereof. Preferred among these are amide-based solvents, ketone-based solvents, aromatic solvents, and mixtures of two or more thereof.

In the production of the urethane resin, the reaction temperature may be a temperature commonly used in a urethanation reaction, and it is usually 20° C. to 100° C. in the presence of a solvent, and is usually 20° C. to 220° C. in the absence of a solvent.

To facilitate the reaction, a catalyst commonly used in a polyurethane reaction [e.g., an amine-based catalyst (such as triethylamine or triethylene diamine) or a tin-based catalyst (such as dibutyl tin dilaurate)] may be used as needed.

In addition, a polymerization terminator [e.g., a monohydric alcohol (such as ethanol, isopropanol, or butanol) or a monovalent amine (such as dimethylamine or dibutylamine) may also be used as needed.

The urethane resin can be produced using a production apparatus commonly used in the relevant industry. In the absence of a solvent, a production apparatus such as a kneader or extruder can be used. The solution viscosity of the thus-produced urethane resin as measured in a 30% by weight (solids) solution in DMF is usually 10 to 10,000 poise/20° C., and from a practical standpoint, it is preferably 100 to 2,000 poise/20° C.

Furthermore, according to a preferred embodiment of the present invention, a polymer having a vinyl monomer as an essential constitutional monomer is also preferred as a coating resin. The polymer having a vinyl monomer as an essential constitutional monomer has flexibility, and thus it is possible to alleviate the volume change of the electrode and suppress expansion of the electrode according to coating the active material with the polymer.

The coating resin is preferably obtained by including a polymer which has a liquid absorption rate of 10% or more when immersed in an electrolyte solution and a tensile elongation at break of 10% or more in a saturated liquid absorption state, and has a vinyl monomer as an essential constitutional monomer.

In particular, it is preferable to include, as a vinyl monomer, a vinyl monomer having a carboxy group and a vinyl monomer represented by the following general formula (1)

In the formula (1), $R^1$ is a hydrogen atom or a methyl group; and $R^2$ is a linear alkyl group having a carbon number of 1 to 4 or a branched alkyl group having a carbon number of 4 to 36.

Examples of the vinyl monomer having a carboxyl group include monocarboxylic acids having a carbon number of 3 to 15 such as (meth)acrylic acid, crotonic acid, and cinnamic acid; dicarboxylic acids having a carbon number of 4 to 24 such as maleic acid (anhydride), fumaric acid, itaconic acid (anhydride), citraconic acid, and mesaconic acid; and trivalent, tetravalent, or higher polycarboxylic acids having a carbon number of 6 to 24 such as aconitic acid. Preferred among these is (meth)acrylic acid, with methacrylic acid being particularly preferred.

In the vinyl monomer represented by the above general formula (1), $R^1$ is a hydrogen atom or a methyl group. $R^1$ is preferably a methyl group.

$R^2$ is a linear alkyl group having a carbon number of 1 to 4 or a branched alkyl group having a carbon number of 4 to 36. Specific examples of $R^2$ include a methyl group, an ethyl group, a propyl group, a 1-alkyl alkyl group (1-methylpropyl group (sec-butyl group), 1,1-dimethylethyl group (tert-butyl group), 1-methylbutyl group, a 1-ethylpropyl group, a 1,1-dimethyl propyl group, a 1-methylpentyl group, a 1-ethylbutyl group, a 1-methylhexyl group, a 1-ethyl pentyl group, a 1-methyl heptyl group, a 1-ethylhexyl group, a 1-methyl octyl group, a 1-ethyl heptyl group, a 1-methyl nonyl group, a 1-ethyl octyl group, a 1-methyldecyl group, a 1-ethyl nonyl group, a 1-butyl eicosyl group, a 1-hexyl octadecyl group, a 1-octyl hexadecyl group, a 1-decyl tetradecyl group, a 1-undecyl tridecyl group or the like), 2-alkyl alkyl group (2-methylpropyl group (iso-butyl group), 2-methylbutyl group, a 2-ethylpropyl group, a 2,2-dimethyl propyl group, a 2-methylpentyl group, a 2-ethylbutyl group, a 2-methylhexyl group, a 2-ethyl pentyl group, a 2-methyl heptyl group, a 2-ethylhexyl group, a 2-methyl octyl group, a 2-ethyl heptyl group, a 2-methyl nonyl group, a 2-ethyl octyl group, a 2-methyldecyl group, a 2-ethyl nonyl group, a 2-hexyl octadecyl group, a 2-octyl hexadecyl group, a 2-decyl tetradecyl group, a 2-undecyl tridecyl group, a 2-dodecyl hexadecyl group, a 2-tridecyl pentadecyl group, a 2-decyl octadecyl group, a 2-tetradecyl octadecyl group, a 2-hexadecyl octadecyl group, a 2-tetradecyl eicosyl group, a 2-hexadecyl eicosyl group or the like), 3 to 34-alkylalkyl groups (such as 3-alkyl alkyl group, 4-alkyl alkyl group, 5-alkyl alkyl group, 32-alkyl alkyl group, 33-alkyl alkyl group, and 34-alkyl alkyl group); mixed alkyl groups containing one or more branched alkyl groups such as residues of oxo alcohols produced corresponding to propylene oligomers (from heptamer to undecamer), ethylene/propylene (molar ratio of 16/1 to 1/11) oligomers, isobutylene oligomers (from heptamer to octamer), and α-olefin (having a carbon number of 5 to 20) oligomer (from tetramer to octamer).

Preferred among these are a methyl group, an ethyl group, and a 2-alkyl alkyl group from the viewpoint of liquid absorption of an electrolyte solution, with a 2-ethylhexyl group and a 2-decyltetradecyl group being more preferred.

In addition to a vinyl monomer and the vinyl monomer represented by the above general formula (1), the monomers constituting the polymer may also include (contain) a copolymerizable vinyl monomer (b3) free of active hydrogen.

Examples of the copolymerizable vinyl monomer (b3) free of active hydrogen include the following monomers (b31) to (b35).

(b31) Hydrocarbyl (meth)acrylates Formed from Monool Having Carbon Number of 1 to 20 and (meth)acrylic Acid Examples of the monool include (i) aliphatic monools [such as methanol, ethanol, n- or i-propyl alcohol, n-butyl alcohol, n-pentyl alcohol, n-octyl alcohol, nonyl alcohol, decyl alcohol, lauryl alcohol, tridecyl alcohol, myristyl alcohol, cetyl alcohol, and stearyl alcohol]; (ii) alicyclic monools [such as cyclohexyl alcohol]; (iii) araliphatic monools [such as benzyl alcohol]; and mixtures of two or more thereof.

(b32) Poly (n=2 to 30)oxyalkylene (having a carbon number of 2 to 4) alkyl (having a carbon number of 1 to 18) ether (meth)acrylates [such as (meth)acrylate of ethylene oxide (hereinbelow, abbreviated as "EO") (10 mol) adduct of methanol, and (meth)acrylate of propylene oxide (hereinbelow, abbreviated as "PO") (10 mol) adduct of methanol]

(b33) Nitrogen-Containing Vinyl Compounds (b33-1) Amide Group-Containing Vinyl Compounds (i) (Meth)acrylamide compounds having a carbon number of 3 to 30, e.g., N,N-dialkyl (having a carbon number of 1 to 6) or diaralkyl (having a carbon number of 7 to 15) (meth)acrylamides [such as N,N-dimethylacrylamide and N,N-dibenzylacrylamide], and diacetone acrylamide (ii) Amide group-containing vinyl compounds having a carbon number of 4 to 20 excluding the above (meth) acrylamide compounds, e.g., N-methyl-N-vinylacetamide and cyclic amides (such as pyrrolidone compounds (having a carbon number of 6 to 13, e.g., N-vinyl pyrrolidone)).

(b33-2) (Meth)acrylate Compounds (i) Dialkyl (having a carbon number of 1 to 4) aminoalkyl (having a carbon number of 1 to 4) (meth)acrylates [such as N,N-dimethylaminoethyl (meth)acrylate, N,N-diethylaminoethyl (meth)acrylate, t-butylaminoethyl (meth)acrylate, and morpholinoethyl (meth)acrylate]

(ii) Quaternary ammonium group-containing (meth)acrylates [quaternary compounds obtained by quaternizing tertiary amino group-containing (meth)acrylates [such as N,N-dimethylaminoethyl (meth)acrylate and N,N-diethylaminoethyl (meth)acrylate] with a quaternizing agent (such as quaternary product obtained by using the quaternizing agent)]

(b33-3) Heterocyclic Ring-Containing Vinyl Compounds

Pyridine compounds (having a carbon number of 7 to 14, e.g., 2- or 4-vinyl pyridine), imidazole compounds (having a carbon number of 5 to 12, e.g., N-vinyl imidazole), pyrrole compounds (having a carbon number of 6 to 13, e.g., N-vinyl pyrrole), and pyrrolidone compounds (having a carbon number of 6 to 13, e.g., N-vinyl-2-pyrrolidone)

(b33-4) Nitrile Group-Containing Vinyl Compounds

Nitrile group-containing vinyl compounds having a carbon number of 3 to 15, e.g., (meth)acrylonitrile, cyanostyrene, and cyanoalkyl (having a carbon number of 1 to 4) acrylate (b33-5) Other Nitrogen-Containing Vinyl Compounds Nitro group-containing vinyl compounds (having a carbon number of 8 to 16, e.g., nitrostyrene)

(b34) Vinyl Hydrocarbons (b34-1) Aliphatic Vinyl Hydrocarbons

Olefins having a carbon number of 2 to 18 or more [such as ethylene, propylene, butene, isobutylene, pentene, heptene, diisobutylene, octene, dodecene, and octadecene], dienes having a carbon number of 4 to 10 or more [such as butadiene, isoprene, 1,4-pentadiene, 1,5-hexadiene, and 1,7-octadiene)

(b34-2) Alicyclic Vinyl Hydrocarbons

Cyclic unsaturated compounds having a carbon number of 4 to 18 or more, e.g., cycloalkene (e.g., cyclohexene), (di)cycloalkadiene [e.g., (di)cyclopentadiene], terpene (e.g., pinene, limonene, and indene)

(b34-3) Aromatic Vinyl Hydrocarbons

Aromatic unsaturated compounds having a carbon number of 8 to 20 or more, e.g., styrene, α-methyl styrene, vinyl toluene, 2,4-dimethyl styrene, ethyl styrene, isopropyl styrene, butyl styrene, phenyl styrene, cyclohexyl styrene, and benzyl styrene (b35) Vinyl Esters, Vineyl Ethers, Vinyl Ketones, Unsaturated Dicarboxylic Acid Diesters (b35-1) Vinyl Esters Aliphatic vinyl esters [having a carbon number of 4 to 15, e.g., alkenyl esters of aliphatic carboxylic acid (mono- or dicarboxylic acid) (e.g., vinyl acetate, vinyl propionate, vinyl butyrate, diallyl adipate, isopropenyl acetate, and vinyl methoxy acetate)], aromatic vinyl esters [having a carbon number of 9 to 20, e.g., alkenyl esters of aromatic carboxylic acid (mono- or dicarboxylic acid) (e.g., vinyl benzoate, diallyl phthalate, methyl-4-vinyl benzoate), and aromatic ring-containing esters of aliphatic carboxylic acid (e.g., acetoxystyrene)]

(b35-2) Vinyl Ethers

Aliphatic vinyl ethers [having a carbon number of 3 to 15, e.g., vinyl alkyl (having a carbon number of 1 to 10) ether (such as vinyl methyl ether, vinyl butyl ether, and vinyl 2-ethylhexyl ether), vinyl alkoxy (having a carbon number of 1 to 6) alkyl (having a carbon number of 1 to 4) ethers (such as vinyl-2-methoxyethyl ether, methoxybutadiene, 3,4-dihydro-1,2-pyran, 2-butoxy-2'-vinyloxy diethyl ether, and vinyl-2-ethylmercapto ethyl ether), and poly(2 to 4) (meth) allyloxyalkane (having a carbon number of 2 to 6) (such as diallyloxyethane, triallyloxyethane, tetraallyloxybutane, and tetramethallyloxyethane)], aromatic vinyl ethers (having a carbon number of 8 to 20, e.g., vinyl phenyl ether and phenoxystyrene)

(b35-3) Vinyl Ketones

Aliphatic vinyl ketones (having a carbon number of 4 to 25, e.g., vinyl methyl ketone and vinyl ethyl ketone), aromatic vinyl ketones (having a carbon number of 9 to 21, e.g., vinyl phenyl ketone)

(b35-4) Unsaturated Dicarboxylic Acid Diesters

Unsaturated dicarboxylic acid diesters having a carbon number of 4 to 34, e.g., dialkyl fumarate (two alkyl groups are each a linear, branched, or alicyclic group having a carbon number of 1 to 22) and dialkyl maleate (two alkyl groups are each a linear, branched, or alicyclic group having a carbon number of 1 to 22)

Preferred among the above examples of the monomer (b3) in terms of liquid absorption of electrolyte solution and withstand voltage are the monomers (b31), (b32), and (b33), with methyl (meth)acrylate, ethyl (meth)acrylate, and butyl (meth)acrylate among the monomers (b31) being more preferred.

In the polymer, content of the vinyl monomer (b1) having a carboxyl group, the vinyl monomer (b2) represented by the above formula (1), the copolymerizable vinyl monomer (b3) free of active hydrogen is preferably as follows based on the weight of the polymer: (b1) is 0.1 to 80% by weight, (b2) is 0.1 to 99.9% by weight, and (b3) is 0 to 99.8% by weight.

As the content of these monomers are in the above ranges, a favorable liquid absorption property for an electrolyte solution is obtained.

More preferred content is 30 to 60% by weight for (b1), 5 to 60% by weight for (b2), and 5 to 80% by weight for (b3); and still more preferred amounts are 35 to 50% by weight for (b1), 15 to 45% by weight for (b2), and 20 to 60% by weight for (b3).

The lower limit of the number average molecular weight of the polymer is preferably 3,000, more preferably 50,000, particularly preferably 100,000, and most preferably 200, 000. The upper limit thereof is preferably 2,000,000, more preferably 1,500,000, particularly preferably 1,000,000, and most preferably 800,000.

The number average molecular weight of the polymer can be measured by GPC (gel permeation chromatography) under the following conditions.

Device: Alliance GPC V2000 (manufactured by Waters.)
Solvent: ortho-dichlorobenzene
Standard substance: polystyrene
Sample concentration: 3 mg/ml
Column solid phase: two PL gel 10 μm MIXED-B columns connected in series (manufactured by Polymer Laboratories Limited)
Column temperature: 135° C.

The solubility parameter ("SP value") of the polymer is preferably 9.0 to 20.0 $(cal/cm^3)^{1/2}$. The SP value of the polymer is more preferably 10.0 to 18.0 $(cal/cm^3)^{1/2}$, still more preferably 11.5 to 14.0 $(cal/cm^3)^{1/2}$. The polymer having an SP value of 9.0 to 20.0 $(cal/cm^3)^{1/2}$ is preferred in terms of liquid absorption of the electrolyte solution.

The glass transition point [hereinbelow, abbreviated as "Tg"; measurement method: differential scanning calorimetry (DSC)] of the polymer is preferably 80° C. to 200° C., more preferably 90° C. to 180° C., and particularly preferably 100° C. to 150° C., from the viewpoint of heat resistance of the battery.

The polymer can be produced by a known polymerization method (such as bulk polymerization, solution polymerization, emulsion polymerization, or suspension polymerization).

Polymerization can be carried out using a known polymerization initiator [e.g., an azo-based initiator [such as 2,2'-azobis(2-methylpropionitrile) or 2,2'-azobis(2,4-dimethylvaleronitrile)], or a peroxide-based initiator (such as benzoyl peroxide, di-t-butylperoxide, or lauryl peroxide)].

The amount of the polymerization initiator to be used based on the total monomer weight is preferably 0.01 to 5% by weight, and more preferably 0.03 to 2% by weight.

In the case of solution polymerization, examples of solvents to be used include esters (having a carbon number of 2 to 8, e.g., ethyl acetate and butyl acetate), alcohols (having a carbon number of 1 to 8, e.g., methanol, ethanol, and octanol), hydrocarbons (having a carbon number of 4 to 8, e.g., n-butane, cyclohexane, and toluene), and ketones (having a carbon number of 3 to 9, e.g., methyl ethyl ketone), and they may be used as a mixture of two or more types. The amount to be used based on the total monomer weight is usually 5 to 900%, and preferably 10 to 400%. The monomer concentration is usually 10 to 95% by weight, and preferably 20 to 90% by weight.

In the case of emulsion polymerization and suspension polymerization, examples of dispersion mediums to be used include water, alcohols (e.g., ethanol), esters (e.g., ethyl propionate), and light naphtha; and examples of emulsifiers to be used include metal salts of higher fatty acids (having a carbon number of 10 to 24) (e.g., sodium oleate and sodium stearate), metal salts of sulfates of higher alcohol (having a carbon number of 10 to 24) (e.g., sodium lauryl sulfate), ethoxylated tetramethyl decyne diol, sodium sulfoethyl methacrylate, and dimethylamino methyl methacrylate. Further, a stabilizer such as polyvinyl alcohol or polyvinyl pyrrolidone may be added.

The monomer concentration in the solution or the dispersion is usually 5 to 95% by weight. The amount of the polymerization initiator to be used based on the total monomer weight is usually 0.01 to 5% by weight, and preferably 0.05 to 2% by weight from the viewpoint of the adhesive force and aggregational force.

Polymerization can be carried out using a known chain transfer agent. For example, a mercapto compound (such as dodecyl mercaptan or n-butyl mercaptan) or a halogenated hydrocarbon (such as carbon tetrachloride, carbon tetrabromide, or benzyl chloride) can be used. The amount to be used based on the total monomer weight is usually 2% by weight or less, and preferably 0.5% by weight or less from the viewpoint of the adhesive force and aggregational force.

In addition, the system temperature in the polymerization reaction is usually −5° C. to 150° C., and preferably 30° C. to 120° C. The reaction time is usually 0.1 to 50 hours, and preferably 2 to 24 hours. The termination of the reaction can be confirmed by the amount of unreacted monomers which is usually 5% by weight or less, and preferably 1% by weight or less of the total amount of the monomers used.

The coating resin may be a crosslinked polymer which is obtained by crosslinking the polymer with a polyepoxy compound and/or a polyol compound.

As for the crosslinked polymer, it is preferred to crosslink the polymer using a crosslinking agent having a reactive functional group that reacts with active hydrogen of a carboxyl group or the like in the polymer, and it is preferred to use the polyepoxy compound and/or the polyol compound as the crosslinking agent.

The polyepoxy compound has an epoxy equivalent of 80 to 2,500. Examples thereof include glycidyl ethers [such as bisphenol A diglycidyl ether, bisphenol F diglycidyl ether, pyrogallol triglycidyl ether, ethylene glycol diglycidyl ether, propylene glycol diglycidyl ether, neopentyl glycol diglycidyl ether, trimethylol propane triglycidyl ether, glycerin triglycidyl ether, polyethylene glycol (Mw 200 to 2,000) diglycidyl ether, polypropylene glycol (Mw 200 to 2,000) diglycidyl ether, and diglycidyl ether of bisphenol A alkylene oxide (1 to 20 mol) adduct]; glycidyl esters (such as phthalic acid diglycidyl ester, trimellitic acid triglycidyl ester, dimer acid diglycidyl ester, and adipic acid diglycidyl ester); glycidylamines [such as N,N-diglycidylaniline, N,N-diglycidyltoluidine, N,N,N',N'-tetraglycidyldiaminodiphenylmethane, N,N,N',N'-tetraglycidylxylylenediamine, 1,3-bis(N,N-diglycidylaminomethyl)cyclohexane, and N,N,N',N'-tetraglycidylhexamethylenediamine]; aliphatic epoxides (such as epoxidized polybutadiene and epoxidized soybean oil); and alicyclic epoxides (such as limonene dioxide and dicyclopentadiene dioxide).

Examples of the polyol compound include low molecular weight polyhydric alcohols [aliphatic or alicyclic diols having a carbon number of 2 to 20 [such as EG, DEG, propylene glycol, 1,3-butylene glycol, 1,4BG, 1,6-hexane diol, 3-methylpentane diol, neopentyl glycol, 1,9-nonane diol, 1,4-dihydroxycyclohexane, 1,4-bis(hydroxymethyl)cyclohexane, and 2,2-bis(4,4'-hydroxycyclohexyl)propane]; aromatic ring-containing diols having a carbon number of 8 to 15 [such as m- or p-xylylene glycol and 1,4-bis(hydroxyethyl) benzene]; triols having a carbon number of 3 to 8 (such as glycerin and trimethylol propane); tetrahydric or higher polyhydric alcohols [such as pentaerythritol, α-methylglucoside, sorbitol, xylite, mannitol, glucose, fructose, sucrose, dipentaerythritol, and polyglycerin (polymerization degree of 2 to 20)]], and alkylene (having a carbon number of 2 to 4) oxide adducts (polymerization degree of 2 to 30) thereof.

As for the amount of the crosslinking agent to be used, the equivalent ratio of active hydrogen-containing groups in the polymer to reactive functional groups in the crosslinking agent is preferably 1:0.01 to 2, more preferably 1:0.02 to 1, in terms of liquid absorption of the electrolyte solution.

Examples of methods for crosslinking the polymer using the crosslinking agent include a method in which an active material is coated with a coating resin consisting of the polymer followed by crosslinking. Specifically, an active material and a resin solution containing the polymer are mixed together and a solvent is removed from the mixture so as to produce a coated active material in which the active material is coated with the resin. Then, a solution containing the crosslinking agent is mixed with the coated active material, and the mixture is heated to remove the solvent and subjected to a crosslinking reaction. In this manner, the active material is coated with the crosslinked polymer.

The heating temperature is preferably 70° C. or higher in the case of using the polyepoxy compound as a crosslinking agent, and is preferably 120° C. or higher in the case of using the polyol compound as a crosslinking agent.

(Method for Producing Coated Active Material)

The coated active material coated with a coating agent can be obtained as follows, for example; an active material is added to a universal mixer and stirred at 10 to 500 rpm, and in the same state, a resin solution containing a coating resin (i.e., resin solution for coating) is added dropwise and mixed over 1 to 90 minutes followed by mixing with a conduction assisting agent, the temperature is increased to 50 to 200° C. under stirring, and the pressure is lowered to 0.007 to 0.04 MPa followed by maintaining it for 10 to 150 minutes. Furthermore, as a solvent for the resin solution, alcohols such as methanol, ethanol, or isopropanol can be suitably used.

The blending ratio between the resin for coating an active material and conduction assisting agent is, although not particularly limited, preferably as follows; resin for coating an active material (resin solid weight):conduction assisting agent=1:0.2 to 3.0 in terms of weight ratio.

The blending ratio between the active material and resin for coating an active material (resin solid weight) is, although not particularly limited, preferably as follows; active material:resin for coating an active material (resin solid weight)=1:0.001 to 0.1 in terms of weight ratio.

Furthermore, although the resin solution for coating contains a coating resin and solvent, it may be prepared by mixing a coating resin and a conduction assisting agent depending on a case. By further mixing a resin solution for coating, which has been mixed in advance, with an active material, the active material can be coated with a resin solution for coating (i.e., coating agent).

Furthermore, it is also possible that, when the active material is coated with a resin solution for coating (i.e., coating agent), the coating resin, active material, and conduction assisting agent are simultaneously admixed with one another, and surface of the active material is coated with a resin solution for coating (i.e., coating agent) which contains the coating resin and conduction assisting agent.

Furthermore, it is also possible that, when the active material is coated with a resin solution for coating (i.e., coating agent), the active material is admixed with the coating resin followed by mixing with a conduction assisting agent, and surface of the active material is coated with a resin solution for coating (i.e., coating agent) which contains the coating resin and conduction assisting agent.

As described above, regarding the coated active material, at least a part of the active material is coated with a coating agent that includes a coating resin and a conduction assisting agent. Depending on one's opinion, such mode can be found to have a core-shell structure. According to this consideration, the average particle diameter of a core part (active material) is, although not particularly limited, preferably 1 to 100 μm, and more preferably 1 to 20 μm from the viewpoint of having higher output power. The thickness of the shell part is not particularly limited, either, but as a thickness of a state in which a gel is not formed, the thickness thereof is preferably 0.01 to 5 μm, and more preferably 0.1 to 2 μm. In addition, as a thickness after the shell part is immersed in an electrolyte solution (1 M $LiPF_6$, ethylene carbonate (EC)/diethyl carbonate (DEC)=3/7 (volume ratio)) at 50° C. for 3 days, the thickness thereof is preferably 0.01 to 10 μm, and more preferably 0.1 to 5 μm.

(Electrolyte Solution)

According to an embodiment of the present invention, the electrolyte solution contained in two electrodes having different polarity or the electrolyte layer is a gel phase electrolyte, and the electrolyte solution contained in an active material layer of the two electrodes having different polarity can be a gel phase electrolyte. The method for having a gel phase electrolyte included in the active material layer is not particularly limited. According to the mode of FIG. 8, on a second principal surface 62 of a non-woven fabric 60, slurry containing a coated active material may also include a gel phase electrolyte. According to the mode of FIG. 9, slurry containing a conductive member 213 and a coated active material may include a gel phase electrolyte. According to the mode of FIG. 10, the composition for active material containing the positive electrode active material 14, conductive fiber 213, and resin 214 may include a gel phase electrolyte. Furthermore, the gel phase electrolyte may be included also by impregnating a gel phase electrolyte in the active material layer prepared as described above.

Herein, the gel phase electrolyte can be produced by having a step of including a gelling agent in a liquid electrolyte. It is sufficient for a liquid electrolyte to have a state in which supporting salts are dissolved in an organic solvent. Examples of the organic solvent which may be used include lactone compounds, cyclic or chain-like carbonate esters, chain-like carboxylate esters, cyclic or chain-like ethers, phosphate esters, nitrile compounds, amide compounds, sulfone, sulfolane, and mixtures thereof. Examples thereof include carbonates such as ethylene carbonate (EC), propylene carbonate (PC), dimethyl carbonate (DMC), diethyl carbonate (DEC), or ethyl methyl carbonate. Preferred among the organic solvents, in terms of output power of the battery and charge-discharge cycle characteristics, are lactone compounds, cyclic carbonate esters, chain-like carbonate esters, and phosphate esters. Lactone compounds, cyclic carbonate esters, and chain-like carbonate esters are more preferred, and mixtures of cyclic carbonate esters and chain-like carbonate esters are particularly preferred. Mixtures of ethylene carbonate (EC) and diethyl carbonate (DEC) are most preferred.

The gel phase electrolyte obtained by including a gelling agent in a liquid electrolyte preferably has conductivity of 0.1 mS/cm or higher. More preferably, the conductivity is 0.1 to 2 mS/cm, and it can be 0.5 to 2 mS/cm.

As the strength of a gel phase material increases, a conductivity of the gel phase material is lowered, and as the gel phase material becomes closer to a liquid phase, the conductivity is increased. Thus, the conductivity of a gel phase material can be used as an index representing the strength of a gel phase material. To form a thick electrode, which is the object of the present invention, strength of an electrode needs to be increased in a related art. As such, if the conductivity of a gel phase electrolyte is within a desirable range, it is desirable both the electric performances of a battery and strength of an electrode can be obtained simultaneously.

Furthermore, the conductivity of a gel phase electrolyte which is used for the non-aqueous electrolyte secondary battery of the present invention can be measured by the following method, and by adding preferable parts of a gelling agent or the like described below to a liquid electrolyte, the conductivity can be adjusted to a suitable range.

[Method for Measuring Conductivity]

By gelling a mixture in which a liquid electrolyte and a gelling agent are admixed with each other at the same ratio as it is used for the non-aqueous electrolyte secondary battery of the present invention, a gel electrolyte is prepared. By using the prepared gel electrolyte, the conductivity is measured at 25° C. by an AC impedance method in view of the method of measuring conduction rate of fine ceramic ion conductor of JIS R 1661-2004.

As a gelling agent, a monomer for gellation can be used, for example. Examples of the monomer for gellation include a monomer or an oligomer which has at least two thermal polymerizable polymerization groups in one molecule. Furthermore, according to a preferred embodiment of the present invention, the matrix polymer for forming the gel phase electrolyte includes carboxylic acid ester as a functional group. When a gel matrix polymer of an electrolyte solution is a gel matrix polymer which has the same functional group as the functional group of a solvent for constituting an electrolyte solution, carboxylic acid ester is included as a functional group.

Examples of the monomer for gellation include bifunctional acrylate such as ethylene glycol di(meth)acrylate, diethylene glycol di(meth)acrylate, triethylene glycol di(meth)acrylate, tetraethylene glycol di(meth)acrylate, propylene di(meth)acrylate, dipropylene di(meth)acrylate, tri propylene di(meth)acrylate, 1,3-butane diol di(meth)acrylate, 1,4-butane diol di(meth)acrylate, or 1,6-hexane diol di(meth)acrylate, trifunctional acrylate such as trimethylol propane tri(meth)acrylate or pentaerythritol tri(meth)acrylate, and tetrafunctional acrylate such as ditrimethylol propane tetra (meth)acrylate or pentaerythritol tetra (meth)acrylate, but not limited thereto. Other than those described above, further examples include a monomer such as urethane acrylate or urethane methacrylate, a copolymer oligomer thereof, and a copolymer oligomer with acrylonitrile, but not limited thereto. Those monomers for gellation are preferably used in combination of two or more types thereof.

Use amount of the monomer for gellation (in the case of combined use of two or more types, total amount thereof) is not particularly limited. However, from the viewpoint of the structural stability of an electrode and opposing ion conductivity, it is preferably 1 to 30 parts by weight, more preferably 2 to 20 parts by weight, and even more preferably 4 to 10 parts by weight relative to 100 parts by weight of a liquid electrolyte (i.e., organic solvent). If it is 5.0 parts by weight or more, in particular, the effect of having further enhanced cycle characteristics can be obtained.

According to a preferred embodiment, the matrix polymer for forming a gel phase electrolyte is obtained by adding a thermal polymerization initiator to an electrolyte solution which contains a mixture of at least a molecule having two polymerizable groups and a molecule having three polymerizable groups, and gelling the electrolyte solution by thermal polymerization. It is believed that, according to combined use of a bifunctional group and a trifunctional group, hardness of a gel can be obtained without lowering the required ion conductivity.

The liquid electrolyte may also contain additives other than the components that are described above. Specific examples of such compounds include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, arylethylene carbonate, vinyloxymethylethylene carbonate, aryloxymethylethylene carbonate, acryloxymethylethylene carbonate, methacryloxymethylethylene carbonate, ethynylethylene carbonate, propartylethylene carbonate, ethynyloxymethylethylene carbonate, propartyloxyethylene carbonate, methylene ethylene carbonate, and 1,1-dimethyl-2-methylene ethylene carbonate. Among them, vinylene carbonate, methylvinylene carbonate, and vinylethylene carbonate are preferable, and vinylene carbonate and vinylethylene carbonate are more preferable. Those cyclic carbonate esters may be used either singly or in combination of two or more types thereof.

Furthermore, the type of the thermal polymerization imitator is not particularly limited. However, an initiator which can react at a temperature at which an electrolyte solution does not decompose and of which decomposition product is not easily oxidized or reduced is preferable. Examples thereof which can be used include t-butylperoxy pyvalate, t-butylperoxyneodecanoate, t-hexylperoxyneodecanoate, t-hexylperoxy pyvalate, t-butylperoxy-2-ethyl hexanoate, and t-butylperoxy isobutyrate. The time for thermal polymerization is not particularly limited, either, but it is 10 to 300 minutes or so.

[Other Components]

At least one of the active material layers contain a conductive member formed of an electron conducting material and a coated active material. Other than those, the electrolyte solution may also contain an ion conductive polymer, supporting salts, or the like.

(Ion Conductive Polymer)

Examples of the ion conductive polymer include a polymer of polyethylene oxide (PEO) and polypropylene oxide (PPO).

(Supporting Salts)

Examples of the supporting salts include lithium salts of inorganic acids such as $LiPF_6$, $LiBF_4$, $LiSbF_6$, $LiAsF_6$, and $LiClO_4$; and lithium salts of organic acids such as $LiN(CF_3SO_2)_2$, $LiN(C_2F_5SO_2)_2$, and $LiC(CF_3SO_2)_3$. $LiPF_6$ is preferred among them in terms of output power of the battery and charge-discharge cycle characteristics.

The blending ratio of the components that are included in an active material layer is not particularly limited. The blending ratio can be adjusted according to suitable reference to the knowledge known for a lithium ion secondary battery. The thickness of each active material layer is not particularly limited, either, and reference can be made suitably to the knowledge known for a battery.

[Electrolyte Layer]

The electrolyte used for the electrolyte layer 17 of this embodiment can be a gel phase electrolyte. Because the gel phase electrolyte has been already explained above, further explanations are omitted herein.

In the bipolar secondary battery of this embodiment, a separator may be used in an electrolyte layer. The separator has a function of holding an electrolyte so as to secure the lithium ion conductivity between a positive electrode and a negative electrode and a function of serving as a partition wall between a positive electrode and a negative electrode.

Examples of a separator form include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which a plurality of them are laminated (for example, a laminate with three-layer structure of PP/PE/PP), and a hydrocarbon based resin such as polyimide, aramid, or polyvinylydene fluoride-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 µm as a single layer or a multilayer. The fine pore diameter of the microporous (microporous membrane) separator is preferably 1 µm or less at most (in general, the pore diameter is about several tens of nanometers). Furthermore, in the present example, a microporous separator was used.

As a non-woven separator, conventionally known ones such as cotton, rayon, acetate, nylon, and polyester; polyolefin such as PP and PE; polyimide and aramid are used either singly or as a mixture. Furthermore, it is sufficient that the thickness of the non-woven separator is the same as that of an electrolyte layer, and the thickness thereof is preferably 5 to 200 µm, and particularly preferably 10 to 100 µm.

[Positive Electrode Current Collecting Plate and Negative Electrode Current Collecting Plate]

The material for forming a current collecting plate (25, 27) is not particularly limited, and a known highly conductive material which has been conventionally used for a current collecting plate for a battery can be used. Preferred examples of the material for forming a current collecting plate include metal materials such as aluminum, copper, titanium, nickel, stainless steel (SUS), and an alloy thereof. From the viewpoint of light weightiness, resistance to corrosion, and high conductivity, aluminum and copper are more preferable. Aluminum is particularly preferable. Furthermore, the same material or a different material may be used for the positive electrode current collecting plate 27 and the negative electrode current collecting plate 25.

<Positive Electrode Lead and Negative Electrode Lead>

Further, although it is not illustrated, the current collector 11 and the current collecting plate (25, 27) may be electrically connected to each other via a positive electrode lead or a negative electrode lead. The same material used for a lithium ion secondary battery of a related art can be also used as a material for forming the positive and negative electrode leads. Furthermore, a portion led from an outer casing is preferably coated with a heat resistant and insulating thermally shrunken tube or the like so that it has no influence on a product (for example, an automobile component, in particular, an electronic device or the like) according to electric leak after contact with peripheral devices or wirings.

<Seal Part>

The seal part (insulation layer) has a function of preventing contact between the current collectors adjacent to each other and preventing a short circuit caused at the end portion of the single battery layer. The material constituting the seal part may be any materials as long as it has an insulation property, a sealing property (sealing performance) to prevent the solid electrolyte from coming off and prevent permeation of external moisture, heat resistance under battery operation temperature and the like. Examples of the material include an acrylic resin, a urethane resin, an epoxy resin, a polyethylene resin, a polypropylene resin, a polyimide resin, and rubber (ethylene-propylene-diene rubber: EPDM). Alternatively, an isocyanate adhesive, an acrylic resin adhesive, a cyanoacrylate adhesive, or the like may be used, and a hot-melt adhesive (urethane resin, polyamide resin, polyolefin resin) may also be used. Among these, from the viewpoint of corrosion resistance, chemical resistance, ease of production (film-forming performance), economical efficiency, and the like, a polyethylene resin or a polypropylene resin is preferably used as a constituent material of the insulation layer, and a resin containing an amorphous polypropylene resin as a main component and obtained by copolymerizing ethylene, propylene, and butene is preferably used.

[Battery Outer Casing]

As a battery outer casing, an envelope-shaped casing capable of covering a power generating element as illustrated in FIG. 1, in which a laminate film 29 including aluminum is contained, may be used in addition to a known metal can casing. As for the laminate film, a laminate film with a three-layered structure formed by laminating PP, aluminum, and nylon in this order can be used, but is not limited thereto. From the viewpoint of having higher output power and excellent cooling performance, and of being suitably usable for a battery for a large instrument such as an EV or an HEV, a laminate film is desirable. In addition, since the group pressure applied from outside to a power generating element can be easily controlled and thus the thickness of an electrolyte solution layer can be easily controlled to a desired value, an aluminate laminate is more preferred for an outer casing.

In the bipolar secondary battery of this embodiment, when a positive electrode active material layer or a negative electrode active material layer is configured by using the above-described sheet-shaped electrode, the stress caused by expansion and shrinkage of an active material is alleviated even when an active material having a large battery capacity is used, and thus the cycle characteristics of the battery can be improved. Therefore, the bipolar secondary battery of this embodiment is suitably used as a power source for operating an EV or an HEV.

Figure 11:
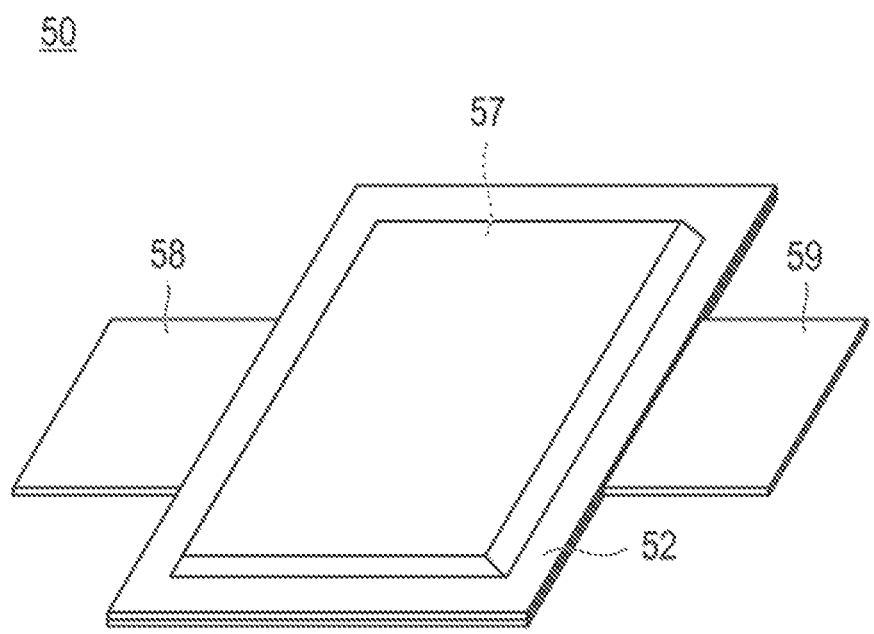
FIG. 11 is a perspective view illustrating an outer appearance of a flat lithium ion secondary battery, which is a representative embodiment of a secondary battery.

FIG. 11 is a perspective view illustrating the appearance of a flat lithium ion secondary battery as a representative embodiment of a secondary battery.

As illustrated in FIG. 11, a flat lithium ion secondary battery 50 has a flat and rectangular shape, and from both sides, a positive electrode tab 58 and a negative electrode tab 59 are drawn to extract electric power. A power generating element 57 is covered by a battery outer casing material (laminate film 52) of the lithium ion secondary battery 50 with its periphery fused by heat. The power generating element 57 is sealed in a state in which the positive electrode tab 58 and the negative electrode tab 59 are led to the outside. Herein, the power generating element 57 corresponds to the power generating element 21 of the lithium ion secondary battery 10 illustrated in FIG. 1 as described above. In the power generating element 57, the positive electrode, the electrolyte layer 17, and the negative electrode are laminated. According to a preferred embodiment, a plurality of them is laminated to give a power generating element.

Incidentally, the lithium ion secondary battery is not limited to a flat shape of laminate type. The winding type lithium ion secondary battery may have a barrel shape or a flat and rectangular shape obtained by modifying the barrel shape, and there is no particular limitation. As an outer casing material of the barrel shape, a laminate film may be used, or a barrel can (metal can) of a related art may be used, and thus there is no particular limitation. Preferably, the power generating element is encased with an aluminum laminate film. The weight reduction may be achieved with such form.

Further, drawing of the tabs 58 and 59 illustrated in FIG. 11 is also not particularly limited. The positive electrode tab 58 and the negative electrode tab 59 may be drawn from the same side or each of the positive electrode tab 58 and the negative electrode tab 59 may be divided into plural tabs and drawn from each side, thus there is no particular limitation on the embodiment illustrated in FIG. 11. In addition, in a winding type lithium ion battery, it is also possible to form a terminal by using, for example, a barrel can (metal can) instead of a tab.

A typical electric vehicle has a battery storage space of about 170 L. Since a cell and an auxiliary machine such as a device for controlling charging and discharging are stored in this space, storage space efficiency of a cell is generally about 50%. The cell loading efficiency for this space is a factor of determining the cruising distance of an electric vehicle. As the size of a single cell decreases, the loading efficiency is lowered, and thus it becomes impossible to maintain the cruising distance.

Therefore, in the present invention, the battery structure of which power generating element is covered with an outer casing preferably has a large size. Specifically, the length of the short side of a laminate cell battery is preferably 100 mm or more. Such a large-sized battery can be used for an automobile. Herein, the length of the short side of the laminate cell battery indicates the length of the shortest side. The upper limit of the length of the short side is not particularly limited, but is generally 400 mm or less.

According to the market requirement, a typical electric vehicle needs to have driving distance (cruising distance) of 100 km per single charge. Considering such a cruising distance, the volume energy density of a battery is preferably 157 Wh/L or more, and the rated capacity is preferably 20 Wh or more.

Further, it is also possible to define the large size of a battery in view of a relation of battery area or battery capacity, from the viewpoint of a large-sized battery, which is different from a physical size of an electrode. For example, in the case of a flat and stack type laminate battery, the problem of having lowered battery characteristics (cycle characteristics), which is caused by the collapse of the crystal structure and the like accompanying expansion and shrinkage of an active material, may occur more easily in a battery having a value of a ratio of the battery area (projected area of a battery including a battery outer casing) to the rated capacity is 5 $cm^2$/Ah or more and having a rated capacity of 3 Ah or more since the battery area per unit capacity is large. Therefore, the non-aqueous electrolyte secondary battery according to this embodiment is preferably a large-sized battery as described above from the viewpoint of having a larger merit obtained from exhibition of the working effects of the present invention. Furthermore, an aspect ratio of a rectangular electrode is preferably 1 to 3, and more preferably 1 to 2. Incidentally, the aspect ratio of the electrode is defined by the longitudinal/transversal ratio of a positive electrode active material layer with a rectangular shape. When the aspect ratio is set to be in such a range, an advantage of having both performances required for a vehicle and loading space can be obtained.

As described above, according to an embodiment of the present invention, an active material of which surface is coated with a conduction assisting agent and a gel matrix polymer is used. Incidentally, in a lithium ion secondary battery of a related art, a polymer compound such as starch, polyvinylidene fluoride, polyvinyl alcohol, carboxylmethyl cellulose, polyvinyl pyrrolidone, tetrafluoroethylene, styrene-butadiene rubber, polyethylene, or polypropylene is used as a binder. However, according to an embodiment of the present invention, there is a merit that a binder may not be used. Furthermore, according to gellation of an electrolyte solution of a battery in which an electrode including a conductive member like carbon fiber is used, excellent rate characteristics of a battery are obtained, a crack or the like does not occur on an electrode even with high thickness, and partial deformation of an electrode is not caused even when nonuniform pressure is applied. As such, excellent cycle durability of a battery can be obtained.

<Assembled Battery>

An assembled battery is formed by connecting plural batteries. Specifically, at least two of them are used in series, in parallel, or in series and parallel. According to arrangement in series or parallel, it is possible to freely adjust the capacity and voltage.

It is also possible to form a detachable small-size assembled battery by connecting plural batteries in series or in parallel. Further, by connecting again plural detachable small-size assembled batteries in series or parallel, an assembled battery having high capacity and high output, which is suitable for a power source or an auxiliary power source for operating a vehicle requiring a high volume energy density and a high volume output density, can be formed. The number of the connected batteries for producing an assembled battery or the number of the stacks of a small-size assembled battery for producing an assembled battery with high capacity may be determined depending on the capacity or output of a battery of a vehicle (electric vehicle) on which the battery is mounted.

<Vehicle>

The non-aqueous electrolyte secondary battery of the present invention can maintain discharge capacity even when it is used for a long period of time, and thus has good cycle characteristics. Further, the non-aqueous electrolyte secondary battery has a high volume energy density. For use in a vehicle such as an electric vehicle, a hybrid electric vehicle, a fuel cell electric vehicle, or a hybrid fuel cell electric vehicle, a long service life is required as well as high capacity and large size compared to use for an electric and mobile electronic device. Therefore, the non-aqueous electrolyte secondary battery described above can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability and output characteristics, and a long service life can be formed, and thus, by mounting this battery, a plug-in hybrid electric vehicle with a long EV driving distance or an electric vehicle with a long single-charge driving distance can be achieved. This is because, when the battery or an assembled battery formed by combining plural batteries is used for, for example, an automobile such as a hybrid car, a fuel cell electric car, and an electric car (including a two-wheel vehicle (motor bike) or a three-wheel vehicle in addition to all four-wheel vehicles (an automobile, a truck, a commercial vehicle such as a bus, a compact car, or the like)), an automobile with a long service life and high reliability can be provided. However, the use is not limited to an automobile, and it can be applied to various power sources of other transportation means, for example, a moving object such as an electric train, and it can be also used as a power source for loading such as an UPS device.

EXAMPLES

Hereinbelow, detailed explanations are given using examples and comparative examples, but the present invention is not limited only to the following examples. Unless particularly described otherwise, "part(s)" means "part(s) by mass".

<Preparation of Resin Solution for Coating>

To a four-necked flask equipped with a stirrer, were charged a thermometer, a reflux condenser, a dropping funnel, and a nitrogen gas introducing tube, 83 parts by mass of ethyl acetate and 17 parts by mass of methanol, and the temperature was raised to 68° C.

Subsequently, a monomer blend solution obtained by blending 242.8 parts by mass of methacrylic acid, 97.1 parts by mass of methyl methacrylate, 242.8 parts by mass of 2-ethylhexyl methacrylate, 52.1 parts by mass of ethyl acetate, and 10.7 parts by mass of methanol, and an initiator solution obtained by dissolving 0.263 part by mass of 2,2'-azobis(2,4-dimethylvaleronitrile) in 34.2 parts by mass of ethyl acetate were continuously added dropwise to the four-necked flask with a dropping funnel while blowing nitrogen thereinto, under stirring over 4 hours, to perform radical polymerization. After completion of dropwise addition, an initiator solution obtained by dissolving 0.583 part by mass of 2,2'-azobis(2,4-dimethylvaleronitrile) in 26 parts by mass of ethyl acetate was continuously added over 2 hours by using a dropping funnel. Furthermore, the polymerization was continued at a boiling point for 4 hours. The solvent was removed, and 582 parts by mass of a resin was obtained, then 1,360 parts by mass of isopropanol was added to obtain a resin solution for coating consisting of a vinyl resin with a resin concentration of 30% by weight.

<Preparation of Coated Positive Electrode Active Material>

96 Parts by weight of LiCoO$_2$ powder [manufactured by Nippon Chemical Industrial Co., Ltd., CELLSEED C-8G] were added to a universal mixer. After stirring at 150 rpm at room temperature (25° C.), a resin solution for coating (resin solid concentration of 30% by weight) was added dropwise over 60 minutes to have the resin solid concentration of 2 parts by weight followed by further stirring for 30 minutes.

Subsequently, in a stirring state, 2 parts by mass of acetylene black [manufactured by Denka Company Limited, Denka Black (registered trademark)] (average particle diameter (primary particle diameter): 0.036 μm) was mixed in three divided times while stirring, and the temperature was raised to 70° C. while keeping stirring for 30 minutes, then the pressure was reduced to 100 mmHg and held for 30 minutes. According to this operation, a coated positive electrode active material was obtained. Furthermore, the tensile elongation at break in a saturated liquid absorption state was found to be 50%. Furthermore, if it is believed that the coated positive electrode active material has a core-shell structure, and the average particle diameter of LiCoO$_2$ powder was 8 μm. Furthermore, shell thickness was 0.14 μm when simple calculation is made for whole coating.

<Preparation of Electrolyte Solution 1>

By dissolving LiPF$_6$ at a ratio of 1 mol/L in a mixed solvent of ethylene carbonate (EC) and diethyl carbonate (DEC) (volume ratio of 1:1), an electrolyte solution for lithium ion battery was prepared.

<Preparation of Electrolyte Solution 2>

To 100 parts by weight of electrolyte solution 1, were added 3.8 parts by weight of triethylene glycol diacrylate and 1 part by weight of trimethylol propane triacrylate as a gelling agent followed by thorough mixing. After that, 0.5 part by weight of t-butylperoxy pyvalate was added as a polymerization initiator followed by mixing. The mixture obtained by mixing was kept in an incubator at 80° C. for thermal polymerization for 2 hours. Conductivity for conductivity measurement was prepared, and after temperature adjustment to 25° C., the conductivity was measured by an AC impedance method in view of the method of measuring conduction rate of fine ceramic ion conductor of JIS R 1661-2004. The conductivity was found to be 0.7 mS/cm.

<Preparation of Electrolyte Solution 3>

To 100 parts by weight of electrolyte solution 1, were added 7.6 parts by weight of triethylene glycol diacrylate and 2 parts by weight of trimethylol propane triacrylate as a gelling agent followed by thorough mixing. After that, 0.5 part by weight of t-butylperoxy pyvalate was added as a polymerization initiator followed by mixing. After performing gellation in the same manner as Example 1, a gel phase electrolyte for conductivity measurement was prepared, and the conductivity was measured. The conductivity was found to be 0.3 mS/cm.

<Production of Positive Electrode Active Material Layer>

Carbon fiber [manufactured by Osaka Gas Chemicals Co., Ltd., DONACARBO Milled S-243, average fiber length: 500 μm, average fiber diameter: 13 μm, electrical conductivity: 200 mS/cm] was prepared as a conductive member.

1.75 Parts by weight of the above carbon fiber and 98.25 parts by weight of the coated positive electrode active material were mixed with 1000 parts by weight of propylene carbonate to prepare a slurry.

On top of a glass filter of a separable flask of which suction part is a glass filter with ϕ70 mm, an aramid non-woven fabric (20 μm) was applied. The slurry dispersed in propylene carbonate was introduced thereto, and by applying pressure of 1.5 kg/cm$^2$ while simultaneously performing suction filtering (depressurization), the coated positive electrode active material and carbon fiber were fixed on the aramid non-woven fabric to produce a positive electrode active material layer.

The coating density of the positive electrode active material layer was set at 120 mg/cm$^2$. The film thickness of the positive electrode active material layer was 500 μm at that time.

<Manufacture of Battery>

Reference Example 1

The positive electrode active material layer was moved such that the surface of the positive electrode active material layer is on top of an Al current collector (i.e., surface of positive electrode active material layer is in contact with Al current collector), and as for the negative electrode, Li metal foil adhered on a Cu current collector was used.

The aramid non-woven fabric which has been obtained by supporting the coated positive electrode active material and carbon fiber and placed on an Al current collector (i.e., coated positive electrode active material layer and aramid non-woven fabric are laminated in order on top of an Al current collector) is added with electrolyte solution 1, and laminated by inserting a PP separator between them (to a negative electrode) (i.e., configuration is such that Al current collector, coated positive electrode active material layer, aramid non-woven fabric, PP separator, Li metal foil, and Cu current collector are laminated in order, and aramid was also used as a separator in combination of polypropylene).

From the positive electrode Al current collector, an Al lead was drawn, and a Ni lead was drawn from the negative electrode Cu current collector. After encasing in an aluminum laminate pack (i.e., laminated film), heat sealing under reduced pressure was carried out. The cell was pressed with two pieces of a SUS plate while being mediated by a rubber sheet.

Example 1

The cell was formed in the same manner as Reference Example 1 except that electrolyte solution 1 is replaced with electrolyte solution 2.

Example 2

The cell was formed in the same manner as Reference Example 1 except that electrolyte solution 1 is replaced with electrolyte solution 3.

Comparative Example 1

By using $LiCoO_2$ which has been used in the above and adding polyvinylidene fluoride, and acetylene black, each in weight ratio of 90:5:5, a slurry was prepared using N-methyl pyrrolidone as a solvent. The slurry was coated by an applicator on an Al current collector such that $LiCoO_2$ can have the coating density that is similar to that of Reference Example 1. After drying on a poplate, an electrode was obtained. When the electrode was punched at $\phi 60$ mm, cracks have occurred.

<Evaluation of Charging and Discharging of Cell>

The cell was set in an incubator at 45° C. Then, the charge-discharge cycle durability test was carried out at the following conditions, and the capacity retention rate after 50 cycles was summarized in Table 1.

The first two cycles include charging at CC-CV of 0.2 C to 4.2 V for total 8 hours and discharging at CC of 0.2 C to 2.5 V. After that, the charging and discharging rate was charging for 3 hours at 0.5 C and CC discharging at 0.5 C, and the capacity retention rate after 50 cycles indicates the value relative to the third discharge capacity at 0.5 C charge-discharge conditions.

As it is understood from Table 1, when an active material is coated with a conduction assisting agent and a coating resin (i.e., gel matrix polymer), a slurry is prepared by adding a conductive member (i.e., carbon fiber), and a film is formed by depressurizing filtration method or the like, a thick-film electrode with favorable reactivity can be prepared. Furthermore, when an electrolyte solution is gellated, a battery with excellent durability can be provided.

TABLE 1

| | Capacity retention rate (%) |
|---|---|
| Reference Example 1 | 83 |
| Example 1 | 91 |
| Example 2 | 93 |
| Comparative Example 1 | Positive electrode with the same weight cannot be used due to cracks |

REFERENCE SIGNS LIST

10 Bipolar secondary battery
11 Current collector
11a Outermost current collector on positive electrode side
11b Outermost current collector on negative electrode side
13 Positive electrode active material layer
15 Negative electrode active material layer
17 Electrolyte layer
19 Single cell layer
21 Power generating element
23 Bipolar electrode
25 Positive electrode current collecting plate
27 Negative electrode current collecting plate
29, 52 Laminate film
31 Seal part
58 Positive electrode tab
59 Negative electrode tab
14 Positive electrode active material
24 Negative electrode active material
111 First principal surface of positive electrode active material layer
121 Second principal surface of positive electrode active material layer
211 First principal surface of negative electrode active material layer
221 Second principal surface of negative electrode active material layer
131 Conductive fiber
16 Conduction assisting agent
151 Coating agent
100 Positive electrode active material layer
213 Conductive fiber
214 Resin
313 Resin
60 Non-woven fabric
62 Second principal surface of non-woven fabric
70 Filter paper
313 Filter paper
470 Filter paper
570 Plate
110 Positive electrode active material layer
50 Flat lithium ion secondary battery
57 Power generating element Incidentally, the present application is based on Japanese Patent Application 2014-265522 which has been filed in Japan on Dec. 26, 2014, and the disclosures of which are incorporated herein by reference in their entirety.

The invention claimed is:

1. A non-aqueous electrolyte secondary battery comprising a power generating element including:
   two electrodes having different polarities, each of the electrodes including an active material layer formed on a current collector; and
   an electrolyte layer positioned between the electrodes,
   wherein the active material layer of at least one of the electrodes contains an active material and a conductive member made from an electron conducting material, the active material layer has a first principal surface which comes into contact with the electrolyte layer, and a second principal surface which comes into contact with the current collector, at least a part of the conductive member forms a conductive path electrically connecting the first principal surface to the second principal surface, and the conductive path is in contact with the active material in a periphery of the conductive path, at least a part of a surface of the active material is coated with a coating agent that includes a coating resin and a conduction assisting agent, an electrolyte solution contained in the electrolyte layer or the electrodes is a gel phase electrolyte, the coating resin has a tensile elongation at break of 10% or more in a saturated liquid absorption state, and the active material layer of at least one of the electrodes does not contain a binder.

2. The non-aqueous electrolyte secondary battery according to claim 1, wherein a conductivity of the gel phase electrolyte is 0.1 mS/cm or more.

3. The non-aqueous electrolyte secondary battery according to claim 1, further comprising:

a matrix polymer configured to form the gel phase electrolyte, the matrix polymer including carboxylic acid ester as a functional group.

4. The non-aqueous electrolyte secondary battery according to claim 1, wherein the coating resin is a urethane resin that is obtained by reacting an active hydrogen component and an isocyanate component.

5. The non-aqueous electrolyte secondary battery according to claim 1, wherein the coating resin is a polymer which has a vinyl monomer as an essential constitutional monomer and the vinyl monomer includes a vinyl monomer having a carboxy group and a vinyl monomer represented by the following formula (1):

$$CH_2=C(R^1)COOR^2 \qquad (1)$$

in the formula (1), $R^1$ is a hydrogen atom or a methyl group; and $R^2$ is a linear alkyl group having a carbon number of 1 to 4 or a branched alkyl group having a carbon number of 4 to 36.

6. The non-aqueous electrolyte secondary battery according to claim 1, further comprising:

a matrix polymer configured to form the gel phase electrolyte, wherein the matrix polymer is obtained by adding a thermal polymerization initiator to an electrolyte solution which contains a mixture of at least a molecule having two polymerizable groups and a molecule having three polymerizable groups, and gelling the electrolyte solution by thermal polymerization.

7. A method for manufacturing a non-aqueous electrolyte secondary battery having a power generating element including two electrodes having different polarities, the method comprising:

forming an active material layer on a current collector; and positioning an electrolyte layer between the electrodes, wherein the active material layer of at least one of the electrodes contains an active material and a conductive member made from an electron conducting material, the active material layer has a first principal surface which comes into contact with the electrolyte layer, and a second principal surface which comes into contact with the current collector, at least a part of the conductive member forms a conductive path electrically connecting the first principal surface to the second principal surface, and the conductive path is in contact with the active material in a periphery of the conductive path, at least a part of a surface of the active material is coated with a coating agent that includes a coating resin and a conduction assisting agent, an electrolyte solution contained in the electrolyte layer or the electrodes is a gel phase electrolyte, the coating resin has a tensile elongation at break of 10% or more in a saturated liquid absorption state, and the active material layer of at least one of the electrodes does not contain a binder.

8. The manufacturing method according to claim 7, further comprising forming the gel phase electrolyte by obtaining a matrix polymer by adding a thermal polymerization initiator to an electrolyte solution which contains at least a molecule having two polymerizable groups and a molecule having three polymerizable groups, and gelling the electrolyte solution by thermal polymerization.

9. The non-aqueous electrolyte secondary battery according to claim 1, wherein a thickness of the active material layer of at least one of the electrodes is 200 µm or more.

10. The non-aqueous electrolyte secondary battery according to claim 1, wherein the active material layer of each of the electrodes does not contain a binder.

11. The manufacturing method according to claim 7, wherein the active material layer of each of the electrodes does not contain a binder.

* * * * *